US012641675B2

(12) United States Patent
Kong et al.

(10) Patent No.: US 12,641,675 B2
(45) Date of Patent: May 26, 2026

(54) COMMUNICATION METHOD AND DEVICE

(71) Applicant: Huawei Technologies Co., Ltd., Shenzhen (CN)

(72) Inventors: Fanhua Kong, Shenzhen (CN); Yiru Kuang, Beijing (CN); Haibo Xu, Beijing (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 414 days.

(21) Appl. No.: 18/248,109

(22) PCT Filed: Aug. 25, 2021

(86) PCT No.: PCT/CN2021/114558
§ 371 (c)(1),
(2) Date: Apr. 6, 2023

(87) PCT Pub. No.: WO2022/073395
PCT Pub. Date: Apr. 14, 2022

(65) Prior Publication Data
US 2023/0403757 A1     Dec. 14, 2023

(30) Foreign Application Priority Data

Oct. 9, 2020   (CN) ......................... 202011075522.X
Oct. 23, 2020   (CN) ......................... 202011148865.4

(51) Int. Cl.
*H04W 76/28* (2018.01)
*H04W 60/00* (2009.01)

(52) U.S. Cl.
CPC ........... *H04W 76/28* (2018.02); *H04W 60/00* (2013.01)

(58) Field of Classification Search
None
See application file for complete search history.

(56) References Cited

U.S. PATENT DOCUMENTS

2023/0199902 A1* 6/2023 Vogedes ................ H04W 68/00
455/458
2023/0269819 A1* 8/2023 Li ......................... H04W 68/02
370/311

FOREIGN PATENT DOCUMENTS

CN       115086987 A      9/2022
EP         2903333 A1      8/2015

OTHER PUBLICATIONS

3GPP TS 24.501 V17.0.0, Sep. 2020, "3rd Generation Partnership Project; Technical Specification Group Core Network and Terminals; Non-Access-Stratum (NAS) protocol for 5G System (5GS); Stage 3; (Release 17)", total 745 pages.

(Continued)

*Primary Examiner* — Suhail Khan

(74) *Attorney, Agent, or Firm* — Slater Matsil, LLP

(57) ABSTRACT

An access network device receives a first cycle from a core network device, where the first cycle is a maximum eDRX cycle that can be configured for a first terminal device, and the first cycle is used by the first terminal device in RRC inactive state. The access network device determines a second cycle based on the first cycle, where the second cycle is an eDRX cycle configured for the first terminal device, the second cycle is used by the first terminal device in RRC inactive state, and a length of the second cycle is less than or equal to a length of the first cycle. The access network device sends a second message to the core network device, where the second message includes the second cycle.

17 Claims, 7 Drawing Sheets

(56) References Cited

OTHER PUBLICATIONS

3GPP TSG-RAN WG3 Meeting #112-e, R3-212060, "Discussion on REDCAP eDRX cycles", Huawei, E-meeting, May 17-28, 2021, total 3 pages.

3GPP TSG-SA WG2 Meeting #134, S2-1908411, "Clarify short DRX cycle length CM-CONNECTED with RRC inactive for eMTC", Qualcomm Incorporated, Sapporo, Japan, Jun. 24-28, 2019, total 4 pages.

3GPP TSG-RAN WG3 Meeting #113-e, R3-213349, "General Analysis of RedCap", Huawei, E-meeting, Aug. 16-26, 2021, total 8 pages.

3GPP TS 23.502 V16.6.0, Sep. 2020, "3rd Generation Partnership Project; Technical Specification Group Services and System Aspects; Procedures for the 5G System (5GS); Stage 2 (Release 16)", total 597 pages.

3GPP TSG CT WG1 Meeting #130-e, C1-213537, "Discussion on NAS impact of extended DRX for RedCap UEs", Huawei, HiSilicon, Electronic meeting, May 20-28, 2021, total 5 pages.

* cited by examiner

COMMUNICATION METHOD AND DEVICE

CROSS-REFERENCE TO RELATED APPLICATIONS

This application is a National Stage of International Application No. PCT/CN2021/114558, filed on Aug. 25, 2021, which claims priority to Chinese Patent Application No. 202011075522.X, filed on Oct. 9, 2020, and Chinese Patent Application No. 202011148865.4, filed on Oct. 23, 2020. All of the aforementioned applications are hereby incorporated by reference in their entireties.

TECHNICAL FIELD

This application relates to the field of communication technologies, and in particular, to a communication method and a device.

BACKGROUND

With discontinuous signal reception, a discontinuous reception (discontinuous reception, DRX) mechanism enables user equipment (user equipment, UE) to stay in a dormant state for most of the time, to save power. Because a packet-based data stream generally occurs in bursts, a receiving circuit of the UE may be turned off to reduce power consumption when there is no data transmission. Extended discontinuous reception (extended discontinuous reception, eDRX) is briefly referred to as extended DRX. During each eDRX cycle, the UE can receive downlink data only in a specified paging time window (paging time window, PTW), and the UE is in the dormant state during other time than the PTW.

It is currently specified that only UE in enhanced machine type communication (enhanced machine type communication, eMTC) can use the eDRX mechanism when being in radio resource control (radio resource control, RRC) inactive (inactive) state, while other UEs such as long term evolution (long term evolution, LTE) UE or new radio (new radio, NR) UE cannot use the eDRX mechanism when being in RRC inactive state. In addition, narrowband internet of things (narrowband internet of things, NB-IoT) UE does not have RRC inactive state, and therefore cannot be in RRC inactive state to use the eDRX mechanism.

At present, reduced capability UE (reduced capability UE, redcap UE) is further proposed, which is a type of UE with a lower capability than legacy (legacy) UE. The redcap UE is NR UE. However, to conserve energy of the redcap UE, it is currently discussed that the redcap UE can also use the eDRX mechanism in RRC inactive state.

For eMTC UE in RRC inactive state, a maximum eDRX cycle length supported is currently specified to be 10.24 seconds (s). If redcap UE in RRC inactive state also uses the eDRX mechanism, the maximum eDRX cycle length that can be supported by the redcap UE may be greater than 10.24 s. However, if an eDRX cycle configured by a base station for the redcap UE to use in RRC inactive state is excessively long, and a core network device sends a non-access stratum (non-access stratum, NAS) message to the redcap UE, the redcap UE may fail to receive the message due to the excessively long eDRX cycle. This is a problem that needs to be resolved currently.

SUMMARY

Embodiments of this application provide a communication method and a device, to increase a probability of successful reception of a NAS message by UE.

According to a first aspect, a communication method is provided. The method includes: When a first terminal device is in RRC idle state, if a core network device obtains downlink data of the first terminal device, the core network device sends a paging message to an access network device, where the paging message is used to page the first terminal device, and the paging message further includes an eDRX cycle used by the first terminal device in RRC idle state. The access network device receives the paging message, and determines a first cycle based on the eDRX cycle that is carried in the paging message and that is used by the first terminal device in RRC idle state, where the first cycle is an eDRX cycle expected to be configured for the first terminal device, and the first cycle is used by the first terminal device in RRC inactive state. The access network device sends the paging message to the first terminal device. The first terminal device receives the paging message, and establishes an RRC connection to the access network device based on the paging message. After the RRC connection is successfully established, the access network device sends an initial UE message to the core network device, where the initial UE message includes the first cycle. The core network device determines a second cycle based on the first cycle and NAS timing information, where the second cycle is an eDRX cycle determined by the core network device for the first terminal device, and the second cycle is used by the first terminal device in RRC inactive state. The core network device sends an initial context setup request message to the access network device, where the initial context setup request message includes the second cycle. The access network device starts an RRC connection release timer when the access network device does not detect data transmission of the UE. The access network device sends an RRC connection release message to the first terminal device when the RRC connection release timer expires, where the RRC connection release message includes the second cycle. The first terminal device monitors paging according to the second cycle when the first terminal device is in RRC inactive state.

In this embodiment of this application, the access network device and the core network device can negotiate to determine the second cycle. The second cycle is an eDRX cycle that can be configured for the first terminal device to use in RRC inactive state. In this manner, a relatively proper eDRX cycle may be provided based on conditions of the access network device and the core network device. Therefore, if the core network device is to send a NAS message to the first terminal device, the NAS message may be sent according to the second cycle. In this way, regardless of whether the second cycle is less than or equal to 10.24 s or greater than 10.24 s, the first terminal device can properly receive the NAS message from the core network device according to the second cycle. This increases a probability of the reception of the NAS message by the terminal device, reduces a packet loss rate of the NAS message, and accordingly reduces a transmission latency of the NAS message.

According to a second aspect, a second communication method is provided. The method may be performed by an access network device or by a chip system. The chip system can implement functions of the access network device. For example, the access network device is a base station. The method includes: The access network device sends a first message to a core network device, where the first message includes a first cycle, the first cycle is an eDRX cycle expected to be configured for a first terminal device, and the first cycle is used by the first terminal device in RRC inactive state. The access network device receives a second message from the core network device, where the second message includes a second cycle, the second cycle is an eDRX cycle determined by the core network device for the first terminal device, the second cycle is used by the first terminal device in RRC inactive state, and a length of the second cycle is the same as or different from that of the first cycle.

In this embodiment of this application, the access network device and the core network device can negotiate to determine the second cycle. The second cycle is an eDRX cycle that can be configured for the first terminal device to use in RRC inactive state. In this manner, a relatively proper eDRX cycle may be provided based on conditions of the access network device and the core network device. Therefore, if the core network device is to send a NAS message to the first terminal device, the NAS message may be sent according to the second cycle. In this way, regardless of whether the second cycle is less than or equal to 10.24 s or greater than 10.24 s, the first terminal device can properly receive the NAS message from the core network device according to the second cycle. This increases a probability of the reception of the NAS message by the terminal device, reduces a packet loss rate of the NAS message, and accordingly reduces a transmission latency of the NAS message.

With reference to the second aspect, in a first optional implementation of the second aspect, when the length of the first cycle is less than or equal to a first threshold, the length of the second cycle is the same as the length of the first cycle; or when the length of the first cycle is greater than the first threshold, the length of the second cycle is less than the length of the first cycle, and the length of the second cycle is less than or equal to the first threshold, where the first threshold is determined based on the NAS timing information.

The first threshold is determined based on the unadjusted NAS timing information, or based on the adjusted NAS timing information. The core network device may increase a time length acceptable to the core network device by adjusting the NAS timing information, so that the time length of the eDRX cycle configured for the UE is longer, and a configuration is more flexible. It may be considered that the first threshold is a time length acceptable to the core network device, and if the time length exceeds the first threshold, the core network device cannot accept the time length. Therefore, the length of the second cycle can be determined based on the first threshold and the first cycle, so that the length of the second cycle can fall within an acceptable range of the core network device.

With reference to the first optional implementation of the second aspect, in a second optional implementation of the second aspect, the NAS timing information includes a minimum retransmission time interval of the NAS message and/or a maximum number of retransmissions of the NAS message.

For example, the NAS timing information includes the minimum retransmission time interval of the NAS message, or the NAS timing information includes the maximum number of retransmissions of the NAS message, or the NAS timing information includes the minimum retransmission time interval of the NAS message and the maximum number of retransmissions of the NAS message.

With reference to the second aspect, the first optional implementation of the second aspect, or the second optional implementation of the second aspect, in a third optional implementation of the second aspect, the first message is an initial UE message.

The access network device may send the first cycle to the core network device by using the initial UE message. For example, an IE is added to the initial UE message, and the first cycle may be carried by the newly added IE. The first cycle is sent to the access network device by using an existing message, and no additional message needs to be added, so that signaling overheads can be reduced. Alternatively, the access network device may send the first cycle to the core network device by using another message.

With reference to any one of the second aspect, or the first optional implementation of the second aspect to the third optional implementation of the second aspect, in a fourth optional implementation of the second aspect, the second message is an initial context setup request message.

The core network device may also send the second cycle to the access network device by using an existing message. For example, the core network device may send the second cycle to the access network device by using the initial context setup request message. The initial context setup request message may include a UE Radio Capability for Paging IE, and the UE Radio Capability for Paging IE may further include UE radio paging information. The UE radio paging information includes some spare fields, and the second cycle is carried by, for example, one or more spare fields included in the UE radio paging information, so that the spare fields are properly used.

With reference to any one of the second aspect, or the first optional implementation of the second aspect to the fourth optional implementation of the second aspect, in a fifth optional implementation of the second aspect, the method further includes: The access network device receives first information from the core network device, where the first information includes an eDRX cycle used by the first terminal device in RRC idle state. The access network device determines the first cycle based on the eDRX cycle used by the first terminal device in RRC idle state.

The core network device may send, to the access network device, the eDRX cycle used by the first terminal device in RRC idle state, so that the access network device may determine the first cycle based on the eDRX cycle.

With reference to the fifth optional implementation of the second aspect, in a sixth optional implementation of the second aspect, the first information is included in a paging message.

The core network device may send the first information to the access network device by using the paging message. The paging message is a core network paging message. For example, the paging message is used to page the first terminal device.

With reference to any one of the second aspect, or the first optional implementation of the second aspect to the sixth optional implementation of the second aspect, in a seventh optional implementation of the second aspect, the method further includes: The access network device sends a third message to the first terminal device, where the third message includes the second cycle.

After determining the second cycle, the access network device may configure the second cycle for the first terminal device, so that the first terminal device can use the second cycle after entering RRC inactive state.

With reference to the seventh optional implementation of the second aspect, in an eighth optional implementation of the second aspect, the sending, by the access network device, the second cycle to the first terminal device includes: the third message is an RRC connection release message, and the RRC connection release message is used to release the first terminal device to RRC inactive state.

The RRC connection release message is used to release the first terminal device to RRC inactive state, and the second cycle is also used by the first terminal device in RRC inactive state. Therefore, the second cycle is sent to the first terminal device by using the RRC connection release message, so that the second cycle can be applied in a relatively timely manner. In addition, the RRC connection release message can not only be used to release the first terminal device to RRC inactive state, but also be used to configure the second cycle for the first terminal device, thereby improving message utilization. In addition, because no additional message needs to be sent to configure the second cycle for the first terminal device, transmission overheads are also reduced.

With reference to any one of the second aspect, or the first optional implementation of the second aspect to the eighth optional implementation of the second aspect, in a ninth optional implementation of the second aspect, the first terminal device is redcap UE.

The first terminal device may be any terminal device served by the access network device. For example, the first terminal device is redcap UE. If an eDRX cycle that can be supported by other redcap UE in RRC inactive state than the first terminal device is greater than 10.24 s, the technical solution in this embodiment of this application is also applicable. In other words, according to the technical solution in this embodiment of this application, suitable eDRX cycles may be configured for different redcap UEs, so that the configured eDRX not only meets a requirement for reception of a NAS message by the terminal device, but also better meets an actual service requirement of the terminal device.

According to a third aspect, a third communication method is provided. The method may be performed by a core network device or by a chip system. The chip system can implement functions of the core network device. For example, the core network device is an AMF. The method includes: The core network device receives a first message from an access network device, where the first message includes a first cycle, the first cycle is an eDRX cycle that the access network device expects to configure for a first terminal device, and the first cycle is used by the first terminal device in RRC inactive state. The core network device sends a second message to the access network device, where the second message includes a second cycle, the first cycle is the eDRX cycle that the access network device expects to configure for the first terminal device, the first cycle is used by the first terminal device in RRC inactive state, the second cycle is determined based on the first cycle and NAS timing information, and a length of the second cycle is the same as or different from that of the first cycle.

With reference to the third aspect, in a first optional implementation of the third aspect, that the second cycle is determined based on the first cycle and NAS timing information includes: when the length of the first cycle is less than or equal to a first threshold, the length of the second cycle is the same as the length of the first cycle; or when the length of the first cycle is greater than the first threshold, the length of the second cycle is less than the length of the first cycle, and the length of the second cycle is less than or equal to the first threshold, where the first threshold is determined based on the NAS timing information.

With reference to the first optional implementation of the third aspect, in a second optional implementation of the third aspect, the NAS timing information includes a minimum retransmission time interval of a NAS message and/or a maximum number of retransmissions of the NAS message.

With reference to the third aspect, or the first optional implementation of the third aspect, or the second optional implementation of the third aspect, in a third optional implementation of the third aspect, the first message is an initial UE message.

With reference to any one of the third aspect, or the first optional implementation of the third aspect to the third optional implementation of the third aspect, in a fourth optional implementation of the third aspect, the second message is an initial context setup request message.

With reference to the third aspect, the first optional implementation of the third aspect, or the fourth optional implementation of the third aspect, in a fifth optional implementation of the third aspect, the method further includes: The core network device sends first information to the access network device, where the first information is used to determine the first cycle, and the first information includes the eDRX cycle used by the first terminal device in RRC idle state.

With reference to the fifth optional implementation of the third aspect, in a sixth optional implementation of the third aspect, the first information is included in a paging message.

With reference to any one of the third aspect, or the first optional implementation of the third aspect to the sixth optional implementation of the third aspect, in a seventh optional implementation of the third aspect, the method further includes: The core network device receives an RRC inactive transition report from the access network device, where the RRC inactive transition report is used to indicate that the first terminal device enters RRC inactive state. The core network device sends the NAS message to the first terminal device according to the second cycle.

With reference to any one of the third aspect, or the first optional implementation of the third aspect to the seventh optional implementation of the third aspect, in an eighth optional implementation of the third aspect, the first terminal device is redcap UE.

For technical effects brought by the third aspect or the optional implementations of the third aspect, refer to the descriptions of the technical effects of the second aspect or the corresponding implementations.

According to a fourth aspect, a fourth communication method is provided. The method may be performed by a first terminal device or by a chip system. The chip system can implement functions of the first terminal device. The method includes: The first terminal device receives a third message from an access network device, where the third message includes a second cycle, the second cycle is an eDRX cycle configured for the first terminal device, the second cycle is used by the first terminal device in RRC inactive state, and the second cycle is determined by the access network device and a core network device through negotiation. When the first terminal device is in RRC inactive state, the first terminal device monitors paging according to the second cycle.

With reference to the fourth aspect, in a first optional implementation of the fourth aspect, the second message is an RRC connection release message, and the RRC connection release message is used to release the first terminal device to RRC inactive state.

With reference to the fourth aspect or the first optional implementation of the fourth aspect, in a second optional implementation of the fourth aspect, the first terminal device is redcap UE.

For technical effects brought by the fourth aspect or the optional implementations of the fourth aspect, refer to the descriptions of the technical effects of the second aspect or the corresponding implementations, or refer to the descriptions of the technical effects of the third aspect or the corresponding implementations.

According to a fifth aspect, a fifth communication method is provided. The method includes: A core network device determines a first cycle based on NAS timing information, where the first cycle is a maximum eDRX cycle that can be configured for a first terminal device, and the first cycle is used by the first terminal device in RRC inactive state. The core network device sends an initial context setup request message to an access network device in a registration process of the first terminal device, where the initial context setup request message includes context information of the first terminal device, and the initial context request message further includes the first cycle. The access network device receives the initial context setup request message, and determining a second cycle based on the first cycle carried in the initial context setup request message, where the second cycle is an eDRX cycle configured for the first terminal device, the second cycle is used by the first terminal device in RRC inactive state, and a length of the second cycle is less than or equal to a length of the first cycle. The access network device sends an initial context setup response message to the core network device, where the initial context setup response message includes the second cycle. When the first terminal device completes registration and the access network device does not detect data transmission of the first terminal device, the access network device starts an RRC connection release timer. When the RRC connection release timer expires, the access network device sends an RRC connection release message to the first terminal device, where the RRC connection release message includes the second cycle. When the first terminal device is in RRC inactive state, the first terminal device monitors paging according to the second cycle.

In this embodiment of this application, the core network device first notifies the access network device of the upper limit acceptable to the core network device, so that the access network device can more accurately configure the eDRX cycle for the first terminal device to use in RRC inactive state, and a process in which the access network device re-determines the eDRX cycle configured for the first terminal device is reduced. The access network device also notifies the core network device of the finally determined second cycle. Therefore, if the core network device is to send a NAS message to the first terminal device, the NAS message may be sent according to the second cycle, so that the first terminal device can properly receive the NAS message from the core network device according to the second cycle. Regardless of whether the second cycle is greater than 10.24 s or less than 10.24 s, a probability of the reception of the NAS message by the terminal device can be increased by using the method in this embodiment of this application, and a packet loss rate of the NAS message can be reduced. In addition, the core network device does not need to page the first terminal device because the NAS message fails to be sent, and the first terminal device does not need to initiate random access after entering RRC idle state, thereby reducing a service transmission latency and saving transmission resources. In addition, in this embodiment of this application, the core network device may use the NAS timing information as a factor to determine the first cycle, and does not need to consider the eDRX cycle used by the first terminal device in RRC idle state, so that a manner of determining the first cycle is more flexible, and the determined first cycle is longer and also meets a requirement of the core network device.

According to a sixth aspect, a sixth communication method is provided. The method may be performed by an access network device or by a chip system. The chip system can implement functions of the access network device. For example, the access network device is a base station. The method includes: The access network device receives a first message from a core network device, where the first message includes a first cycle, the first cycle is a maximum eDRX cycle that can be configured for a first terminal device, and the first cycle is used by the first terminal device in RRC inactive state. The access network device determines a second cycle based on the first cycle, where the second cycle is an eDRX cycle configured for the first terminal device, the second cycle is used by the first terminal device in RRC inactive state, and a length of the second cycle is less than or equal to a length of the first cycle. The access network device sends a second message to the core network device, where the second message includes the second cycle.

In this embodiment of this application, the core network device first notifies the access network device of the upper limit acceptable to the core network device, so that the access network device can more accurately configure the eDRX cycle for the first terminal device to use in RRC inactive state, and a process in which the access network device re-determines the eDRX cycle configured for the first terminal device is reduced. The access network device also notifies the core network device of the finally determined second cycle. Therefore, if the core network device is to send a NAS message to the first terminal device, the NAS message may be sent according to the second cycle, so that the first terminal device can properly receive the NAS message from the core network device according to the second cycle. Regardless of whether the second cycle is greater than 10.24 s or less than 10.24 s, a probability of the reception of the NAS message by the terminal device can be increased by using the method in this embodiment of this application, and a packet loss rate of the NAS message can be reduced. In addition, the core network device does not need to page the first terminal device because the NAS message fails to be sent, and the first terminal device does not need to initiate random access after entering RRC idle state, thereby reducing a service transmission latency and saving transmission resources. In addition, in this embodiment of this application, the core network device may use the NAS timing information as a factor to determine the first cycle, and does not need to consider the eDRX cycle used by the first terminal device in RRC idle state, so that a manner of determining the first cycle is more flexible, and the determined first cycle is longer and also meets a requirement of the core network device.

With reference to the sixth aspect, in a first optional implementation of the sixth aspect,
    the first message is an initial context setup request message; and/or
    the second message is an initial context setup response message, or the second message is an RRC inactive transition report.

The core network device may send the first cycle to the access network device, and the access network device may send the second cycle to the core network device by using an existing message without adding another message, so that the technical solution in this embodiment of this application can be better compatible with an existing technology. Alternatively, the first cycle or the second cycle may be sent by using another message, for example, may be sent by using a newly added dedicated message, to reduce impact on a function of an existing message.

With reference to the sixth aspect or the first optional implementation of the sixth aspect, in a second optional implementation of the sixth aspect, the method further includes: The access network device sends a third message to the first terminal device, where the third message includes the second cycle.

After determining the second cycle, the access network device may configure the second cycle for the first terminal device, so that the first terminal device can use the second cycle after entering RRC inactive state.

With reference to the second optional implementation of the sixth aspect, in a third optional implementation of the second aspect, the third message is an RRC connection release message, and the RRC connection release message is used to release the first terminal device to RRC inactive state.

The RRC connection release message is used to release the first terminal device to RRC inactive state, and the second cycle is also used by the first terminal device in RRC inactive state. Therefore, the second cycle is sent to the first terminal device by using the RRC connection release message, so that the second cycle can be applied in a relatively timely manner. In addition, the RRC connection release message can not only be used to release the first terminal device to RRC inactive state, but also be used to configure the second cycle for the first terminal device, thereby improving message utilization. In addition, because no additional message needs to be sent to configure the second cycle for the first terminal device, transmission overheads are also reduced.

With reference to any one of the sixth aspect, or the first optional implementation of the sixth aspect to the third optional implementation of the sixth aspect, in a fourth optional implementation of the second aspect, lengths of eDRX cycles that are configured, based on the first cycle, by the access network device for different terminal devices to use in RRC inactive state are different.

For example, the access network device may determine the second cycle based on the first cycle and a capability of the first UE, so that the second cycle can meet the capability of the first UE; or the access network device may determine the second cycle based on the first cycle and a service requirement of the first UE, so that the second cycle can meet the service requirement of the first UE; or the access network device may determine the second cycle based on the first cycle, the capability of the first UE, and the service requirement of the first UE. A factor used by the access network device to determine the second cycle is not limited. Because the access network device can configure an eDRX cycle for the UE based on an actual situation (for example, a service requirement or a capability) of the UE, eDRX cycles that are determined by the access network device for different UEs to use in RRC inactive state may be the same or different.

With reference to any one of the sixth aspect, or the first optional implementation of the sixth aspect to the fourth optional implementation of the sixth aspect, in a fifth optional implementation of the second aspect, the first terminal device is redcap UE.

The first terminal device may be any terminal device served by the access network device. For example, the first terminal device is redcap UE. If an eDRX cycle that can be supported by other redcap UE in RRC inactive state than the first terminal device is greater than 10.24 s, the technical solution in this embodiment of this application is also applicable. In other words, according to the technical solution in this embodiment of this application, suitable eDRX cycles may be configured for different redcap UEs, so that the configured eDRX not only meets a requirement for reception of a NAS message by the terminal device, but also better meets an actual service requirement of the terminal device.

According to a seventh aspect, a seventh communication method is provided. The method may be performed by a core network device or by a chip system. The chip system can implement functions of the core network device. For example, the core network device is an AMF. The method includes: The core network device sends a first message to an access network device, where the first message includes a first cycle, the first cycle is a maximum eDRX cycle that can be configured for a first terminal device, and the first cycle is used by the first terminal device in RRC inactive state. The core network device receives a second message from the access network device, where the second message includes a second cycle, the second cycle is an eDRX cycle configured for the first terminal device, the second cycle is used by the first terminal device in RRC inactive state, and a length of the second cycle is less than or equal to a length of the first cycle.

With reference to the seventh aspect, in a first optional implementation of the seventh aspect, the first cycle is determined based on NAS timing information, and the NAS timing information includes a minimum retransmission time interval of a NAS message and/or a maximum number of retransmissions of the NAS message.

For example, the core network device may determine the first cycle based on the NAS timing information. Compared with a manner in which the first cycle is determined based on the eDRX cycle used by the first terminal device in RRC idle state, the first cycle is determined based on the NAS timing information, so that a time length of the determined first cycle is longer, and the access network device has higher flexibility in configuring the first terminal device, and the first cycle also meets a requirement of the core network device. In addition, optionally, in addition to the NAS timing information, the core network device may further consider another factor to determine the first cycle. For example, the core network device determines the first cycle based on the NAS timing information and a service requirement of the first terminal device. In this way, the first cycle can meet the service requirement of the first terminal device in addition to a requirement for reception of the NAS message by the first terminal device.

With reference to the seventh aspect or the first optional implementation of the seventh aspect, in a second optional implementation of the seventh aspect, the first message is an initial context setup request message; and/or the second message is an initial context setup response message, or the second message is an RRC inactive transition report.

With reference to the seventh aspect, the first optional implementation of the seventh aspect, or the second optional implementation of the seventh aspect, in a third optional implementation of the seventh aspect, the method further includes: The core network device receives an RRC inactive transition report from the access network device, where the RRC inactive transition report is used to indicate that the first terminal device enters RRC inactive state. The core network device sends the NAS message to the first terminal device according to the second cycle.

With reference to any one of the seventh aspect, or the first optional implementation of the seventh aspect to the third optional implementation of the seventh aspect, in a fourth optional implementation of the seventh aspect, the first terminal device is redcap UE.

For technical effects brought by the seventh aspect or the optional implementations of the seventh aspect, refer to the descriptions of the technical effects of the sixth aspect or the corresponding implementations.

According to an eighth aspect, an eighth communication method is provided. The method may be performed by a first terminal device or by a chip system. The chip system can implement functions of the first terminal device. The method includes: The first terminal device determines a third message from an access network device, where the third message includes a second cycle, the second cycle is an eDRX cycle configured for the first terminal device, the second cycle is used by the first terminal device in RRC inactive state, the second cycle is determined by the access network device based on a first cycle, the first cycle is a maximum eDRX cycle that can be configured by a core network device for the first terminal device, the first cycle is used by the first terminal device in RRC inactive state, and a length of the second cycle is less than or equal to a length of the first cycle. When the first terminal device is in RRC inactive state, the first terminal device monitors the paging according to the second cycle.

With reference to the eighth aspect, in a first optional implementation of the eighth aspect, the second message is an RRC connection release message, and the RRC connection release message is used to release the first terminal device to RRC inactive state.

With reference to the eighth aspect or the first optional implementation of the eighth aspect, in a second optional implementation of the eighth aspect, the first terminal device is redcap UE.

For technical effects brought by the eighth aspect or the optional implementations of the eighth aspect, refer to the descriptions of the technical effects of the sixth aspect or the corresponding implementations, or refer to the descriptions of the technical effects of the seventh aspect or the corresponding implementations.

According to a ninth aspect, a ninth communication method is provided. The method may be performed by an access network device or by a chip system. The chip system can implement functions of the access network device. For example, the access network device is a base station. The method includes: The access network device receives a first message from a core network device, where the first message includes a first cycle, the first cycle is a maximum eDRX cycle that can be configured for a terminal device, and the first cycle is used by the first terminal device in RRC inactive state. The access network device determines a second cycle based on the first cycle, where the second cycle is a maximum eDRX cycle configured for a terminal device, the second cycle is used by the terminal device in RRC inactive state, and a length of the second cycle is less than or equal to a length of the first cycle. The access network device sends a second message to the core network device, where the second message includes the second cycle.

In this embodiment of this application, the core network device first notifies the access network device of the upper limit acceptable to the core network device, so that the access network device can more accurately configure eDRX cycles for a plurality of terminal devices to use in RRC inactive state, and a process in which the access network device re-determines the eDRX cycles configured for the plurality of terminal devices is reduced. The access network device also notifies the core network device of the finally determined second cycle. Therefore, if the core network device is to send a NAS message to any terminal device in the plurality of terminal devices, the NAS message may be sent according to the second cycle, so that the plurality of terminal devices can properly receive the NAS message from the core network device. Regardless of whether the second cycle is greater than 10.24 s or less than 10.24 s, a probability of the reception of the NAS message by the terminal device can be increased by using the method in this embodiment of this application, and a packet loss rate of the NAS message can be reduced. The core network device does not need to page the terminal device because the NAS message fails to be sent, and the terminal device does not need to initiate random access after entering RRC idle state, thereby reducing a service transmission latency and saving transmission resources. In addition, for any one of the plurality of terminal devices, the core network device may send the NAS message according to the second cycle, and there is no need to maintain different eDRX cycles for different terminal devices, thereby simplifying an implementation process of the core network device.

With reference to the ninth aspect, in a first optional implementation of the ninth aspect, the first message is an AMF configuration update message, and the second message is an AMF configuration update acknowledgment message; or the first message is an NG setup response message.

The core network device may send the first cycle to the access network device, and the access network device may send the second cycle to the core network device by using an existing message without adding another message, so that the technical solution in this embodiment of this application can be better compatible with an existing technology. Alternatively, the first cycle or the second cycle may be sent by using another message, for example, may be sent by using a newly added dedicated message, to reduce impact on a function of an existing message.

With reference to the ninth aspect or the first optional implementation of the ninth aspect, in a second optional implementation of the ninth aspect, the method further includes: The access network device sends a third message to the first terminal device in the terminal device, where the third message includes a third cycle, a length of the third cycle is less than or equal to a length of the second cycle, the third cycle is an eDRX cycle configured for the first terminal device, and the third cycle is used by the first terminal device in RRC inactive state. The access network device sends a fourth message to a second terminal device in the terminal device, where the fourth message includes a fourth cycle, a length of the fourth cycle is less than or equal to a length of the second cycle, the fourth cycle is an eDRX cycle configured for the second terminal device, and the third cycle is used by the first terminal device in RRC inactive state, where a length of the third cycle is the same as or different from a length of the fourth cycle.

The second cycle determined by the access network device is an eDRX cycle upper limit that can be configured for the plurality of terminal devices. Further, the access network device may separately configure, based on the second cycle and some other factors, eDRX cycles for different terminal devices in the plurality of terminal to use in RRC inactive state. For example, for one of the plurality of terminal devices, the access network device may determine, based on the second cycle, an eDRX cycle used by the terminal device in RRC inactive state, and such a determining manner is relatively simple; or the access network device may determine, based on the second cycle and a service of the terminal device, an eDRX cycle used by the terminal device in RRC inactive state, so that the configured eDRX cycle can meet a requirement for reception of a NAS message by the terminal device, and a service transmission requirement of the terminal device. Because different terminal devices have different conditions (for example, capabilities or service requirements), the eDRX cycles that are determined by the access network device for the different terminal devices to use in RRC inactive state may be the same or different. The access network device may send, to a corresponding terminal device, an eDRX cycle that is configured for each terminal device to use in RRC inactive state, so that the terminal device can use the eDRX cycle configured by the access network device in RRC inactive state.

With reference to the ninth aspect, the first optional implementation of the ninth aspect, or the second optional implementation of the ninth aspect, in a third optional implementation of the ninth aspect, lengths of the second cycle determined by the access network device for different terminal devices based on the first cycle are different.

With reference to the ninth aspect, the first optional implementation of the ninth aspect, the second optional implementation of the ninth aspect, or the third optional implementation of the ninth aspect, in a fourth optional implementation of the ninth aspect, the terminal device is redcap UE.

According to the technical solution in this embodiment of this application, suitable eDRX cycles may be separately configured for the different redcap UEs, so that the configured eDRX not only meets a requirement for reception of a NAS message by the terminal device, but also better meets an actual service requirement of the terminal device.

According to a tenth aspect, a tenth communication method is provided. The method may be performed by a core network device or by a chip system. The chip system can implement functions of the core network device. For example, the core network device is an AMF. The method includes: The core network device sends a first message to an access network device, where the first message includes a first cycle, the first cycle is a maximum eDRX cycle that can be configured for a terminal device, and the first cycle is used by the terminal device in RRC inactive state. The core network device receives a second message from the access network device, where the second message includes a second cycle, the second cycle is a maximum eDRX cycle configured for a terminal device, the second cycle is used by the terminal device in RRC inactive state, and a length of the second cycle is less than or equal to a length of the first cycle.

With reference to the tenth aspect, in a first optional implementation of the tenth aspect, the first cycle is determined based on NAS timing information, and the NAS timing information includes a minimum retransmission time interval of a NAS message and/or a maximum number of retransmissions of the NAS message.

With reference to the tenth aspect or the first optional implementation of the tenth aspect, in a second optional implementation of the tenth aspect, the first message is an AMF configuration update message, and the second message is an AMF configuration update acknowledgment message; or the first message is an NG setup response message.

With reference to the tenth aspect, the first optional implementation of the tenth aspect, or the second optional implementation of the tenth aspect, in a third optional implementation of the tenth aspect, the method further includes: The core network device receives an RRC inactive transition report from the access network device, where the RRC inactive transition report is used to indicate that a first terminal device enters RRC inactive state. The core network device sends a NAS message to the first terminal device in the terminal device according to the second cycle, where the first terminal device is any terminal device covered by the access network device.

With reference to the tenth aspect, the first optional implementation of the tenth aspect, the second optional implementation of the tenth aspect, or the third optional implementation of the tenth aspect, in a fourth optional implementation of the tenth aspect, the terminal device is redcap UE.

For technical effects brought by the tenth aspect or the optional implementations of the tenth aspect, refer to the descriptions of the technical effects of the ninth aspect or the corresponding implementations, or refer to the descriptions of the technical effects of the seventh aspect or the corresponding implementations.

According to an eleventh aspect, an eleventh communication method is provided. The method may be performed by a first terminal device or by a chip system. The chip system can implement functions of the first terminal device. The method includes: The first terminal device receives a third message from an access network device, where the third message includes a third cycle, the third cycle is an eDRX cycle configured for the first terminal device, the third cycle is used by the first terminal device in RRC inactive state, the third cycle is determined by the access network device based on a first cycle and a second cycle, the first cycle is a maximum eDRX cycle that can be configured by a core network device for a plurality of terminal devices, the first cycle is used by the plurality of terminal devices in RRC inactive state, the second cycle is a maximum eDRX cycle configured by the access network device for the plurality of terminal devices, the second cycle is used by the plurality of terminal devices in RRC inactive state, the second cycle is determined based on the first cycle, a length of the second cycle is less than or equal to a length of the first cycle, and the plurality of terminal devices include the first terminal device. When the first terminal device is in RRC inactive state, the first terminal device monitors paging according to the third cycle.

With reference to the eleventh aspect, in a first optional implementation of the eleventh aspect, the third message is an RRC connection release message, and the RRC connection release message is used to release the first terminal device to RRC inactive state.

With reference to the eleventh aspect or the first optional implementation of the eleventh aspect, in a first optional implementation of the eleventh aspect, the first terminal device is redcap UE.

For technical effects brought by the eleventh aspect or the optional implementations of the eleventh aspect, refer to descriptions of technical effects of the ninth aspect or the corresponding implementations, or refer to descriptions of technical effects of the tenth aspect or the corresponding implementations.

According to a twelfth aspect, a twelfth communication method is provided. The method may be performed by an access network device or by a chip system. The chip system can implement functions of the access network device. For example, the access network device is a base station. The method includes: The access network device receives a first message from a core network device, where the first message includes a first cycle, the first cycle is a maximum eDRX cycle that can be configured for a terminal device, and the first cycle is used by the terminal device in RRC inactive state. The access network device determines a second cycle based on the first cycle, where the second cycle is a maximum eDRX cycle configured for a first terminal device in the terminal device, the second cycle is used by the first terminal device in RRC inactive state, and a length of the second cycle is less than or equal to a length of the first cycle. The access network device sends a second message to the first terminal device, where the second message includes the second cycle.

In this embodiment of this application, the core network device notifies the access network device of the upper limit acceptable to the core network device, and the access network device may configure eDRX cycles for different UEs based on the upper limit, so that the access network device can more accurately configure the eDRX cycles for the plurality of UEs to use in RRC inactive state, and a process in which the access network device re-determines the eDRX cycles configured for the plurality of UEs is reduced. If the core network device is to send the NAS message to any one of the plurality of UEs, the NAS message may be sent according to the first cycle, so that the plurality of UEs can properly receive the NAS message from the core network device. Regardless of whether the first cycle is greater than 10.24 s or less than 10.24 s, a probability of the reception of the NAS message by the UE can be increased by using the method in this embodiment of this application, and a packet loss rate of the NAS message can be reduced. The core network device does not need to page the first UE because the NAS message fails to be sent, and the first UE does not need to initiate random access after entering RRC idle state, thereby reducing a service transmission latency and saving transmission resources. In addition, for any one of the plurality of UEs, the core network device may send the NAS message according to the second cycle, and there is no need to maintain different eDRX cycles for different UEs, thereby simplifying an implementation process of the core network device.

With reference to the twelfth aspect, in a first optional implementation of the twelfth aspect, the first message is an AMF configuration update message, or the first message is an NG setup response message.

With reference to the twelfth aspect or the first optional implementation of the twelfth aspect, in a second optional implementation of the twelfth aspect, the method further includes: The access network device determines a third cycle based on the first cycle, where the third cycle is a maximum eDRX cycle configured for a second terminal device in the terminal device, the third cycle is used by the second terminal device in RRC inactive state, and a length of the third cycle is less than or equal to a length of the first cycle. The access network device sends a third message to the second terminal device, where the third message includes the third cycle, and a length of the second cycle is the same as or different from a length of the third cycle.

With reference to the twelfth aspect, the first optional implementation of the twelfth aspect, or the second optional implementation of the twelfth aspect, in a third optional implementation of the twelfth aspect, lengths of the eDRX cycles determined by the access network device for different terminal devices based on the first cycle are different.

With reference to the twelfth aspect, the first possible implementation of the twelfth aspect, the second possible implementation of the twelfth aspect, or the third possible implementation of the twelfth aspect, in a fourth possible implementation of the twelfth aspect, the terminal device is redcap UE.

For technical effects brought by the twelfth aspect or the optional implementations of the twelfth aspect, refer to the descriptions of the technical effects of the ninth aspect or the corresponding implementations.

According to a thirteenth aspect, a thirteenth communication method is provided. The method may be performed by a core network device or by a chip system. The chip system can implement functions of the core network device. For example, the core network device is an AMF. The method includes: The core network device determines a first cycle, where the first cycle is a maximum eDRX cycle that can be configured for a terminal device, and the first cycle is used by the terminal device in RRC inactive state. The core network device sends a first message to an access network device, where the first message includes the first cycle.

With reference to the thirteenth aspect, in a first optional implementation of the thirteenth aspect, the first cycle is determined based on NAS timing information, and the NAS timing information includes a minimum retransmission time interval of a NAS message and/or a maximum number of retransmissions of the NAS message.

With reference to the thirteenth aspect or the first optional implementation of the thirteenth aspect, in a second optional implementation of the thirteenth aspect, the first message is an AMF configuration update message, or the first message is an NG setup response message.

With reference to the thirteenth aspect, the first optional implementation of the thirteenth aspect, or the second optional implementation of the thirteenth aspect, in a third optional implementation of the thirteenth aspect, the method further includes: The core network device receives an RRC inactive transition report from the access network device, where the RRC inactive transition report is used to indicate that a first terminal device in the terminal device enters RRC inactive state. The core network device sends a NAS message to the first terminal device based on the first cycle.

With reference to the thirteenth aspect, the first optional implementation of the thirteenth aspect, the second optional implementation of the thirteenth aspect, or the third optional implementation of the thirteenth aspect, in a fourth optional implementation of the thirteenth aspect, the terminal device is redcap UE.

For technical effects brought by the thirteenth aspect or the optional implementations of the thirteenth aspect, refer to the descriptions of the technical effects of the twelfth aspect or the corresponding implementations.

According to a fourteenth aspect, a fourteenth communication method is provided. The method may be performed by a first terminal device or by a chip system. The chip system can implement functions of the first terminal device. The method includes: The first terminal device receives a second message from an access network device, where the second message includes a second cycle, the second cycle is an eDRX cycle configured for the first terminal device, the second cycle is used by the first terminal device in RRC inactive state, the second cycle is determined by the access network device based on a first cycle, the first cycle is a maximum eDRX cycle that can be configured by a core network device for a plurality of terminal devices, the first cycle is used by the plurality of terminal devices in RRC inactive state, a length of the second cycle is less than or equal to a length of the first cycle, and the plurality of terminal devices include the first terminal device. When the first terminal device is in RRC inactive state, the first terminal device monitors the paging according to the second cycle.

With reference to the fourteenth aspect, in a first optional implementation of the fourteenth aspect, the second message is an RRC connection release message, and the RRC connection release message is used to release the first terminal device to RRC inactive state.

With reference to the fourteenth aspect or the first optional implementation of the fourteenth aspect, in a second optional implementation of the fourteenth aspect, the terminal device is redcap UE.

For technical effects brought by the fourteenth aspect or the optional implementations of the fourteenth aspect, refer to the descriptions of the technical effects of the twelfth aspect or the corresponding implementations.

According to a fifteenth aspect, a communication apparatus is provided. The communication apparatus may include modules configured to perform the method according to any one of the second aspect or the optional implementations of the second aspect, for example, include a transceiver unit and a processing unit. Optionally, the communication apparatus may further include a storage unit.

According to a sixteenth aspect, a communication apparatus is provided. The communication apparatus may include modules configured to perform the method according to any one of the third aspect or the optional implementations of the third aspect, for example, include a transceiver unit and a processing unit. Optionally, the communication apparatus may further include a storage unit.

According to a seventeenth aspect, a communication apparatus is provided. The communication apparatus may include modules configured to perform the method according to any one of the fourth aspect or the optional implementations of the fourth aspect, for example, include a transceiver unit and a processing unit. Optionally, the communication apparatus may further include a storage unit.

According to an eighteenth aspect, a communication apparatus is provided. The communication apparatus may include modules configured to perform the method according to any one of the sixth aspect or the optional implementations of the sixth aspect, for example, include a transceiver unit and a processing unit. Optionally, the communication apparatus may further include a storage unit.

According to a nineteenth aspect, a communication apparatus is provided. The communication apparatus may include modules configured to perform the method according to any one of the seventh aspect or the optional implementations of the seventh aspect, for example, include a transceiver unit and a processing unit. Optionally, the communication apparatus may further include a storage unit.

According to a twentieth aspect, a communication apparatus is provided. The communication apparatus may include modules configured to perform the method according to any one of the eighth aspect or the optional implementations of the eighth aspect, for example, include a transceiver unit and a processing unit. Optionally, the communication apparatus may further include a storage unit.

According to a twenty-first aspect, a communication apparatus is provided. The communication apparatus may include modules configured to perform the method according to any one of the ninth aspect or the optional implementations of the ninth aspect, for example, include a transceiver unit and a processing unit. Optionally, the communication apparatus may further include a storage unit.

According to a twenty-second aspect, a communication apparatus is provided. The communication apparatus may include modules configured to perform the method according to any one of the tenth aspect or the optional implementations of the tenth aspect, for example, include a transceiver unit and a processing unit. Optionally, the communication apparatus may further include a storage unit.

According to a twenty-third aspect, a communication apparatus is provided. The communication apparatus may include modules configured to perform the method according to any one of the eleventh aspect or the optional implementations of the eleventh aspect, for example, include a transceiver unit and a processing unit. Optionally, the communication apparatus may further include a storage unit.

According to a twenty-fourth aspect, a communication apparatus is provided. The communication apparatus may include modules configured to perform the method according to any one of the twelfth aspect or the optional implementations of the twelfth aspect, for example, include a transceiver unit and a processing unit. Optionally, the communication apparatus may further include a storage unit.

According to a twenty-fifth aspect, a communication apparatus is provided. The communication apparatus may include modules configured to perform the method according to any one of the thirteenth aspect or the optional implementations of the thirteenth aspect, for example, include a transceiver unit and a processing unit. Optionally, the communication apparatus may further include a storage unit.

According to a twenty-sixth aspect, a communication apparatus is provided. The communication apparatus may include modules configured to perform the method according to any one of the fourteenth aspect or the optional implementations of the fourteenth aspect, for example, include a transceiver unit and a processing unit. Optionally, the communication apparatus may further include a storage unit.

According to a twenty-seventh aspect, a chip system is provided, where the chip system includes one or more processors and includes a communication interface, and the processor is coupled to the communication interface and is configured to implement the method according to any one of the second aspect or the optional implementations of the second aspect. Optionally, the chip system may further include a memory. For example, the processor may read and execute a software program stored in the memory, to implement the method according to any one of the second aspect or the optional implementations of the second aspect.

According to a twenty-eighth aspect, a chip system is provided. The chip system includes one or more processors and includes a communication interface. The processor is coupled to the communication interface, and is configured to implement the method according to any one of the third aspect or the optional implementations of the third aspect. Optionally, the chip system may further include a memory. For example, the processor may read and execute a software program stored in the memory, to implement the method according to any one of the third aspect or the optional implementations of the third aspect.

According to a twenty-ninth aspect, a chip system is provided. The chip system includes one or more processors and includes a communication interface. The processor is coupled to the communication interface, and is configured to implement the method according to any one of the fourth aspect or the optional implementations of the fourth aspect. Optionally, the chip system may further include a memory. For example, the processor may read and execute a software program stored in the memory, to implement the method according to any one of the fourth aspect or the optional implementations of the fourth aspect.

According to a thirtieth aspect, a chip system is provided. The chip system includes one or more processors and includes a communication interface. The processor is coupled to the communication interface, and is configured to implement the method provided in any one of the sixth aspect or the optional implementations of the sixth aspect. Optionally, the chip system may further include a memory. For example, the processor may read and execute a software program stored in the memory, to implement the method according to any one of the sixth aspect or the optional implementations of the sixth aspect.

According to a thirty-first aspect, a chip system is provided, where the chip system includes one or more processors and includes a communication interface, and the processor is coupled to the communication interface, and is configured to implement the method provided in any one of the seventh aspect or the optional implementations of the seventh aspect. Optionally, the chip system may further include a memory. For example, the processor may read and execute a software program stored in the memory, to implement the method according to any one of the seventh aspect or the optional implementations of the seventh aspect.

According to a thirty-second aspect, a chip system is provided, where the chip system includes one or more processors and includes a communication interface, and the processor is coupled to the communication interface and is configured to implement the method provided in any one of the eighth aspect or the optional implementations of the eighth aspect. Optionally, the chip system may further include a memory. For example, the processor may read and execute a software program stored in the memory, to implement the method according to any one of the eighth aspect or the optional implementations of the eighth aspect.

According to a thirty-third aspect, a chip system is provided, where the chip system includes one or more processors and includes a communication interface, and the processor is coupled to the communication interface and is configured to implement the method provided in any one of the ninth aspect or the optional implementations of the ninth aspect. Optionally, the chip system may further include a memory. For example, the processor may read and execute a software program stored in the memory, to implement the method according to any one of the ninth aspect or the optional implementations of the ninth aspect.

According to a thirty-fourth aspect, a chip system is provided, where the chip system includes one or more processors and includes a communication interface, and the processor is coupled to the communication interface and is configured to implement the method provided in any one of the tenth aspect or the optional implementations of the tenth aspect. Optionally, the chip system may further include a memory. For example, the processor may read and execute a software program stored in the memory, to implement the method according to any one of the tenth aspect or the optional implementations of the tenth aspect.

According to a thirty-fifth aspect, a chip system is provided. The chip system includes one or more processors and includes a communication interface. The processor is coupled to the communication interface, and is configured to implement the method according to any one of the eleventh aspect or the optional implementations of the eleventh aspect. Optionally, the chip system may further include a memory. For example, the processor may read and execute a software program stored in the memory, to implement the method according to any one of the eleventh aspect or the optional implementations of the eleventh aspect.

According to a thirty-sixth aspect, a chip system is provided. The chip system includes one or more processors and includes a communication interface. The processor is coupled to the communication interface, and is configured to implement the method according to any one of the twelfth aspect or the optional implementations of the twelfth aspect. Optionally, the chip system may further include a memory. For example, the processor may read and execute a software program stored in the memory, to implement the method according to any one of the twelfth aspect or the optional implementations of the twelfth aspect.

According to a thirty-seventh aspect, a chip system is provided. The chip system includes one or more processors and includes a communication interface. The processor is coupled to the communication interface, and is configured to implement the method provided in any one of the thirteenth aspect or the optional implementations of the thirteenth aspect. Optionally, the chip system may further include a memory. For example, the processor may read and execute a software program stored in the memory, to implement the method according to any one of the thirteenth aspect or the optional implementations of the thirteenth aspect.

According to a thirty-eighth aspect, a chip system is provided. The chip system includes one or more processors and includes a communication interface. The processor is coupled to the communication interface, and is configured to implement the method provided in any one of the fourteenth aspect or the optional implementations of the fourteenth aspect. Optionally, the chip system may further include a memory. For example, the processor may read and execute a software program stored in the memory, to implement the method according to any one of the fourteenth aspect or the optional implementations of the fourteenth aspect.

According to a thirty-ninth aspect, a first communication system is provided. The first communication system includes the communication apparatus according to the fifteenth aspect or the chip system according to the twenty-seventh aspect, the communication apparatus according to the sixteenth aspect or the chip system according to the twenty-eighth aspect, and the communication apparatus according to the seventeenth aspect or the chip system according to the twenty-ninth aspect. Alternatively, the first communication system includes the core network device, the access network device, and the first terminal device according to the first aspect.

According to a fortieth aspect, a second communication system is provided. The second communication system includes the communication apparatus according to the eighteenth aspect or the chip system according to the thirtieth aspect, the communication apparatus according to the nineteenth aspect or the chip system according to the thirty-first aspect, and the communication apparatus according to the twentieth aspect or the chip system according to the thirty-second aspect. Alternatively, the second communication system includes the core network device, the access network device, and the first terminal device according to the fifth aspect.

According to a forty-first aspect, a third communication system is provided. The third communication system includes the communication apparatus according to the twenty-first aspect or the chip system according to the thirty-third aspect, the communication apparatus according to the twenty-second aspect or the chip system according to the thirty-fourth aspect, and the communication apparatus according to the twenty-third aspect or the chip system according to the thirty-fifth aspect.

According to a forty-second aspect, a fourth communication system is provided. The fourth communication system includes the communication apparatus according to the twenty-fourth aspect or the chip system according to the thirty-sixth aspect, the communication apparatus according to the twenty-fifth aspect or the chip system according to the thirty-seventh aspect, and the communication apparatus according to the twenty-sixth aspect or the chip system according to the thirty-eighth aspect.

According to a forty-third aspect, a fifteenth communication method is provided. The method may be performed by an access network device or by a chip system. The chip system can implement functions of the access network device. For example, the access network device is a base station. The method includes: The access network device receives a first message from a core network device, where the first message includes a first cycle, the first cycle is a maximum eDRX cycle that can be configured for a first terminal device, and the first cycle is used by the first terminal device in RRC inactive state. The access network device determines a second cycle based on the first cycle, where the second cycle is an eDRX cycle configured for the first terminal device, the second cycle is used by the first terminal device in RRC inactive state, and a length of the second cycle is less than or equal to a length of the first cycle. The access network device sends a second message to the first terminal device, where the second message includes the second cycle.

In this embodiment of this application, the core network device first notifies the access network device of the upper limit acceptable to the core network device, so that the access network device can more accurately configure the eDRX cycle for first UE to use in RRC inactive state, and a process in which the access network device re-determines the eDRX cycle configured for the first UE is reduced. The access network device configures an eDRX cycle for the first UE based on the first cycle. If the core network device is to send the NAS message to the first UE, the NAS message may be sent according to the first cycle, so that the first UE can properly receive the NAS message from the core network device based on the eDRX cycle configured by the access network device. Regardless of whether the second cycle is greater than 10.24 s or less than 10.24 s, a probability of the reception of the NAS message by the UE can be increased by using the method in this embodiment of this application, and a packet loss rate of the NAS message can be reduced. In addition, the access network device does not need to notify the core network device of the eDRX cycle determined for the first UE, thereby reducing signaling overheads. In addition, the core network device does not need to page the first UE because the NAS message fails to be sent, and the first UE does not need to initiate random access after entering RRC idle state, thereby reducing a transmission latency of the NAS message and saving transmission resources. In addition, in this embodiment of this application, the core network device may use the NAS timing information as a factor to provide an eDRX cycle upper limit (for example, the first cycle) as a reference for the access network device, and the access network device does not need to consider the eDRX cycle used by the first UE in RRC idle state to configure the eDRX cycle for the first UE to use in RRC inactive state, so that a manner of configuring the eDRX cycle for the UE is more flexible.

With reference to the forty-third aspect, in a first optional implementation of the forty-third aspect, the first message is an initial context setup request message.

With reference to the forty-third aspect, or the first optional implementation of the forty-third aspect, in a second optional implementation of the forty-third aspect, the second message is an RRC connection release message, and the RRC connection release message is used to release the first terminal device to RRC inactive state.

With reference to the forty-third aspect or the first optional implementation of the forty-third aspect or the second optional implementation of the forty-third aspect, in a third optional implementation of the forty-third aspect, the first terminal device is redcap UE.

For technical effects brought by some optional implementations of the forty-third aspect, refer to the descriptions of the technical effects of the sixth aspect or the corresponding implementations.

According to a forty-fourth aspect, a sixteenth communication method is provided. The method may be performed by a core network device or by a chip system. The chip system can implement functions of the core network device. For example, the core network device is an AMF. The method includes: The core network device determines a first cycle, where the first cycle is a maximum eDRX cycle that can be configured for a first terminal device, and the first cycle is used by the first terminal device in RRC inactive state. The core network device sends a first message to an access network device, where the first message includes the first cycle.

With reference to the forty-fourth aspect, in a first optional implementation of the forty-fourth aspect, the first cycle is determined based on NAS timing information, and the NAS timing information includes a minimum retransmission time interval of a NAS message and/or a maximum number of retransmissions of the NAS message.

With reference to the forty-fourth aspect or the first optional implementation of the forty-fourth aspect, in a second optional implementation of the forty-fourth aspect, the first message is an initial context setup request message.

With reference to the forty-fourth aspect, the first optional implementation of the forty-fourth aspect, or the second optional implementation of the forty-fourth aspect, in a third optional implementation of the forty-fourth aspect, the method further includes: The core network device receives an RRC inactive transition report from the access network device, where the RRC inactive transition report is used to indicate that the first terminal device enters RRC inactive state. The core network device sends a NAS message to the first terminal device based on the first cycle.

With reference to the forty-fourth aspect or the first optional implementation of the forty-fourth aspect or the second optional implementation of the forty-fourth aspect or the third optional implementation of the forty-fourth aspect, in a fourth optional implementation of the forty-fourth aspect, the first terminal device is redcap UE.

For technical effects brought by the forty-fourth aspect or the optional implementations of the forty-fourth aspect, refer to the descriptions of the technical effects of the forty-third aspect or the corresponding implementations.

According to a forty-fifth aspect, a seventeenth communication method is provided. The method may be performed by a first terminal device or by a chip system. The chip system can implement functions of the first terminal device. The method includes: The first terminal device receives a second message from an access network device, where the second message includes a second cycle, the second cycle is an eDRX cycle configured for the first terminal device, the second cycle is used by the first terminal device in RRC inactive state, the second cycle is determined by the access network device based on a first cycle, the first cycle is a maximum eDRX cycle that can be configured by a core network device for the first terminal device, the first cycle is used by the first terminal device in RRC inactive state, and a length of the second cycle is less than or equal to a length of the first cycle. When the first terminal device is in RRC inactive state, the first terminal device monitors the paging according to the second cycle.

With reference to the forty-fifth aspect, in a first optional implementation of the forty-fifth aspect, the second message is an RRC connection release message, and the RRC connection release message is used to release the first terminal device to RRC inactive state.

With reference to the forty-fifth aspect or the first optional implementation of the forty-fifth aspect, in a second optional implementation of the forty-fifth aspect, the first terminal device is redcap UE.

For technical effects brought by the forty-fifth aspect or the optional implementations of the forty-fifth aspect, refer to the descriptions of the technical effects of the forty-third aspect or the corresponding implementations.

According to a forty-sixth aspect, a communication apparatus is provided. The communication apparatus may include modules configured to perform the method according to any one of the forty-third aspect or the optional implementations of the forty-third aspect, for example, include a transceiver unit and a processing unit. Optionally, the communication apparatus may further include a storage unit.

According to a forty-seventh aspect, a communication apparatus is provided. The communication apparatus may include a module configured to perform the method according to any one of the forty-fourth aspect or the optional implementations of the forty-fourth aspect, for example, include a transceiver unit and a processing unit. Optionally, the communication apparatus may further include a storage unit.

According to a forty-eighth aspect, a communication apparatus is provided. The communication apparatus may include modules configured to perform the method according to any one of the forty-fifth aspect or the optional implementations of the forty-fifth aspect, for example, include a transceiver unit and a processing unit. Optionally, the communication apparatus may further include a storage unit.

According to a forty-ninth aspect, a chip system is provided. The chip system includes one or more processors and includes a communication interface. The processor is coupled to the communication interface, and is configured to implement the method provided in any one of the forty-third aspect or the optional implementations of the forty-third aspect. Optionally, the chip system may further include a memory. For example, the processor may read and execute a software program stored in the memory, to implement the method according to any one of the forty-third aspect or the optional implementations of the forty-third aspect.

According to a fiftieth aspect, a chip system is provided, where the chip system includes one or more processors and includes a communication interface, and the processor is coupled to the communication interface, and is configured to implement the method according to any one of the forty-fourth aspect or the optional implementations of the forty-fourth aspect. Optionally, the chip system may further include a memory. For example, the processor may read and execute a software program stored in the memory, to implement the method according to any one of the forty-fourth aspect or the optional implementations of the forty-fourth aspect.

According to a fifty-first aspect, a chip system is provided, where the chip system includes one or more processors and includes a communication interface, and the processor is coupled to the communication interface, and is configured to implement the method according to any one of the forty-fifth aspect or the optional implementations of the forty-fifth aspect. Optionally, the chip system may further include a memory. For example, the processor may read and execute a software program stored in the memory, to implement the method according to any one of the forty-fifth aspect or the optional implementations of the forty-fifth aspect.

According to a fifty-second aspect, a fifth communication system is provided. The fifth communication system includes the communication apparatus according to the forty-sixth aspect or the chip system according to the forty-ninth aspect, the communication apparatus according to the forty-seventh aspect or the chip system according to the fiftieth aspect, and the communication apparatus according to the forty-eighth aspect or the chip system according to the fifty-first aspect.

According to a fifty-third aspect, a computer-readable storage medium is provided. The computer-readable storage medium is configured to store a computer program. When the computer program is run on a computer, the computer is enabled to perform the method according to any one of the foregoing aspects.

According to a fifty-fourth aspect, a computer program product including instructions is provided. The computer program product is configured to store a computer program. When the computer program is run on a computer, the computer is enabled to perform the method according to any one of the foregoing aspects.

DETAILED DESCRIPTION OF ILLUSTRATIVE EMBODIMENTS

Figures 1, 2:
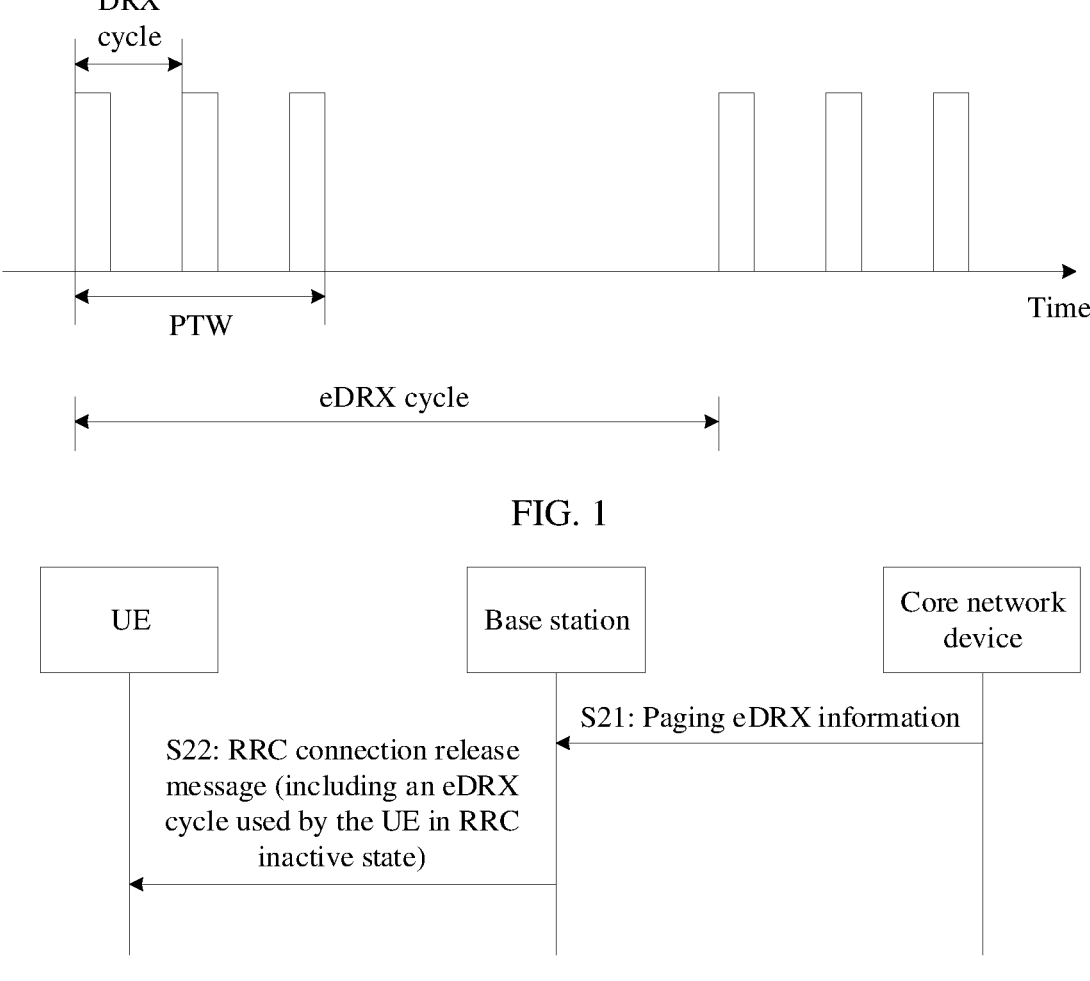
FIG. 1 is a schematic diagram of an eDRX cycle.
FIG. 2 is a flowchart of configuring an eDRX cycle in RRC inactive state for eMTC UE.

To make objectives, technical solutions, and advantages of embodiments of this application clearer, the following further describes embodiments of this application in detail with reference to the accompanying drawings.

In the following descriptions, some terms in embodiments of this application are described, to help a person skilled in the art have a better understanding.

In embodiments of this application, a terminal device is a device having a wireless transceiver function, and may be a fixed device, a mobile device, a handheld device, a wearable device, a vehicle-mounted device, or a wireless apparatus (for example, a communication module or a chip system) built in the foregoing device. The terminal device is configured to connect people, things, machines, and the like, and may be widely used in various scenarios, for example, including but not limited to the following scenarios: cellular communications, device-to-device (device-to-device, D2D) communications, vehicle to everything (vehicle to everything, V2X), machine to machine/machine type communications (machine-to-machine/machine-type communications, M2M/MTC), the internet of things (internet of things, IoT), virtual reality (virtual reality, VR), augmented reality (augmented reality, AR), industrial control (industrial control), self driving (self driving), remote medical (remote medical), smart grid (smart grid), smart home, smart office, smart wearables, smart transportation, smart city (smart city), uncrewed aerial vehicle, and robot. The terminal device may be sometimes referred to as UE, a terminal, an access station, a UE station, a remote station, a wireless communication device, a user apparatus, or the like. For ease of description, in embodiments of this application, an example in which the terminal device is UE is used.

For example, the UE in embodiments of this application is, for example, redcap UE. Compared with existing common NR UE, a redcap UE device usually supports only a lower bandwidth, for example, 20 MHz, and supports fewer transmit and receive antennas, for example, supports only 1T1R or 1T2R. According to research content of an existing subject, redcap UE includes three types of reduced capability UEs: a wearable product, a video surveillance device, and an industrial sensor device. Certainly, in addition to the redcap UE, the technical solutions in embodiments of this application may be further applied to other UE, for example, to UE that is insensitive (or has a low requirement) to latency, for example, eMTC UE. In the following, the technical solutions provided in embodiments of this application are mainly applied, for example, to the redcap UE.

The network device in embodiments of this application includes, for example, an access network device and/or a core network device. The access network device is a device having a wireless transceiver function, and is configured to communicate with the terminal device. The access network device includes, but is not limited to, a base station (BTS, Node B, eNodeB/eNB, or gNodeB/gNB) or a transmission reception point (transmission reception point, TRP) in the foregoing communication system, a further evolved base station in 3GPP, an access node in a Wi-Fi system, a wireless relay node, a wireless backhaul node, or the like. The base station may be a macro base station, a micro base station, a picocell base station, a small cell, a relay station, or the like. A plurality of base stations may support the foregoing networks of a same access technology, or the foregoing networks of different access technologies. The base station may include one or more co-site or non-co-site transmission reception points. The network device may alternatively be a radio controller, a centralized unit (centralized unit, CU), and/or a distributed unit (distributed unit, DU) in a cloud radio access network (cloud radio access network, CRAN) scenario. The network device may alternatively be a server, a wearable device, a vehicle-mounted device, or the like. For example, a network device in the V2X technology may be a road side unit (road side unit, RSU). In the following description, an example in which the access network device is a base station is used. A plurality of network devices in the communication system may be base stations of a same type or base stations of different types. The base station may communicate with the terminal device, or may communicate with the terminal device via a relay station. The terminal device may communicate with a plurality of base stations of different access technologies. The core network device is configured to implement functions such as mobility management, data processing, session management, and policy and charging. Names of devices that implement core network functions in systems of different access technologies may be different. This is not limited in this application. Using a 5G system as an example, the core network device may include an access and mobility management function (access and mobility management function, AMF), a session management function (session management function, SMF), a user plane function (user plane function, UPF), or the like. Using a 4G system as an example, the core network device may include a mobility management entity (mobility management entity) and the like.

In embodiments of this application, an apparatus configured to implement functions of the network device may be a network device, or may be an apparatus, for example, a chip system, that can support the network device in implementing the function. The apparatus may be installed in the network device. In the technical solutions provided in embodiments of this application, the technical solutions provided in embodiments of this application are described by using an example in which the apparatus configured to implement the function of the network device is the network device.

In embodiments of this application, unless otherwise specified, a quantity of a noun represents "a singular noun or a plural noun", that is, "one or more". In addition, "at least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between the associated objects. For example, A/B indicates A or B. "At least one of the following items (pieces)" or a similar expression thereof indicates any combination of these items, including a single item (piece) or any combination of a plurality of items (pieces). For example, at least one item (piece) of a, b, or c may represent: a, b, c, a and b, a and c, b and c, or a, b, and c, where a, b, and c may be singular or plural.

In addition, unless otherwise specified, the ordinal numbers such as "first" and "second" mentioned in embodiments of this application are used for distinguishing a plurality of objects, but are not intended to limit sizes, content, a sequence, a time sequence, priorities, importance, or the like of the plurality of objects. For example, a first cycle and a second cycle may be a same cycle (for example, the cycles have the same time length), or may be different cycles (for example, the cycles have different time lengths). In addition, such a name does not indicate that the two cycles have different time lengths, priorities, or importance levels.

The foregoing describes some terms in embodiments of this application. The following describes technical features in embodiments of this application.

With discontinuous signal reception, a DRX mechanism enables UE to stay in a dormant state for most of the time, to save power. Because a packet-based data stream generally occurs in bursts, a receiving circuit of the UE may be turned off to reduce power consumption when there is no data transmission. eDRX is short for extended DRX. During each eDRX cycle, the UE can receive downlink data only in a specified PTW. The UE is in the dormant state during other time than the PTW. There is one PTW in each eDRX cycle, and the UE monitors a paging channel in the PTW according to the DRX cycle. If a larger eDRX cycle is configured, the UE may have a higher power consumption gain, but a service transmission latency is also increased. For eDRX working modes, refer to FIG. 1.

Because different types of UE, such as LTE UE, eMTC UE, NB-IoT UE, or NR UE, have different service requirements, the different types of UE have different applications of an eDRX mechanism and the DRX mechanism. For details, refer to Table 1.

TABLE 1

|  | RRC idle (idle) state | RRC inactive state |
|---|---|---|
| LTE UE | A maximum DRX cycle is 2.56 s (DRX up to 2.56 s) | A maximum DRX cycle is 2.56 s |
| eMTC UE | A maximum eDRX cycle is 44 minutes (DRX up to 44 min) | A maximum eDRX cycle is 10.24 s (eDRX up to 10.24 s) |
| NB-IoT UE | A maximum eDRX cycle is 3 hours (DRX up to 3 h) | |
| NR UE | A maximum DRX cycle is 2.56 s | A maximum DRX cycle is 2.56 s |

It can be learned from Table 1 that currently, both the LTE UE and the NR UE support only the DRX mechanism, and neither of them supports the eDRX mechanism. For the two types of UE, the maximum DRX cycle that can be supported in both RRC idle state and RRC inactive state is 2.56 s. The eMTC UE can support the maximum eDRX cycle of about 44 minutes in RRC idle state, and support the maximum eDRX cycle of 10.24 s in RRC inactive state. The eMTC UE is the only UE that can support the eDRX mechanism in RRC inactive state among the several types of UEs. The NB-IoT UE does not have RRC inactive state. The NB-IoT UE can support the maximum eDRX cycle of about 3 hours in RRC idle state.

Currently, working time requirements for the redcap UE in various application scenarios are proposed. For example, an industrial wireless sensor device in the redcap UE needs to work for several years, and a wearable device in the redcap UE needs to work for one to two weeks. Currently, eDRX is not configured for the NR UE. However, to meet the foregoing working time requirements, eDRX of the redcap UE in RRC idle state and RRC inactive state needs to be studied, to reduce power consumption.

The eDRX cycle used by the UE in RRC idle state is configured by a core network device by using a NAS message in a UE registration (registration) process. The eDRX cycle used by the eMTC UE in RRC inactive state is configured by a base station by using an RRC connection release (RRC connection release) message. The eDRX cycle used when the UE is in RRC idle state is a core network paging cycle (core network paging cycle) configured by the core network device for the UE, and the eDRX cycle used when the UE is in RRC inactive state is a radio access network (radio access network, RAN) paging cycle configured by the base station for the UE. Currently, only the eMTC UE can be configured with the eDRX cycle in RRC inactive state (that is, the eDRX cycle used in RRC inactive state). For a configuration procedure, refer to FIG. 2.

S21: The core network device sends core network assistance information for RRC inactive (core network assistance information for RRC inactive) to the base station, and the base station receives the core network assistance information for RRC inactive from the core network device. The core network assistance information for RRC inactive is an information element (information element, IE), and the IE is, for example, included in an initial context setup request (initial context setup request) message.

The core network assistance information for RRC inactive may include a UE specific DRX (UE specific DRX) cycle and include paging (paging) eDRX information. The paging eDRX information is an eDRX cycle used when the UE is in RRC idle state.

S22: The base station sends an RRC connection release message to the UE, and the UE receives the RRC connection release message from the base station.

The base station determines, with reference to the paging eDRX information in the core network assistance information for RRC inactive, an eDRX cycle configured for the UE to use in RRC inactive state. A time length of the eDRX cycle configured by the base station for the UE to use in RRC inactive state is less than or equal to a time length of the eDRX cycle corresponding to the paging eDRX information. After determining the eDRX cycle configured for the UE to use in RRC inactive state, the base station may send the eDRX cycle to the UE by using the RRC connection release message, so that after entering RRC inactive state, the UE may monitor paging according to the eDRX cycle.

It is currently defined that, in mobility management (mobility management), a minimum retransmission time interval of a NAS message is 6 s, and a maximum number of retransmissions is 4. When connected to a 5G core network (5GC), the eMTC UE may be in RRC inactive state. When the UE is in RRC inactive state, because the base station still retains a context of the UE and a connection to a next generation (next generation, NG) interface of the core network, the core network device considers that the UE is in RRC connected (connected) state. However, both the base station and the UE know that the UE is actually in RRC inactive state. In this case, an abnormal scenario of inconsistent perception of the state of the UE occurs. If the core network device sends the NAS message to the UE when the UE is in RRC inactive state, the base station pages the UE after receiving the NAS message from the core network device, and sends the NAS message to the UE after the UE responds to the paging. After the UE responds to the paging, the access network device sends feedback information corresponding to the NAS message to the core network device. Because it is already specified that the minimum retransmission time interval of the NAS message is 6 s, and the maximum number of retransmissions is 4, the core network device needs to receive the feedback information for the NAS message within 30 s. Otherwise, the core network device considers that the NAS message fails to be transmitted. If the core network device considers that the NAS message fails to be transmitted, the core network device pages the UE. If the UE receives a paging message from the core network device, the UE needs to enter RRC idle state, and then initiates random access in RRC idle state.

It can be learned from the foregoing description that when configuring the eDRX cycle for the UE in RRC inactive state, the base station refers to the paging eDRX information in the core network assistance information for RRC inactive. For the eMTC UE, it is already specified that the maximum eDRX cycle in RRC inactive state is 10.24 s. Therefore, the eDRX cycle does not affect the reception of the NAS message by the UE. However, if the redcap UE can also support the eDRX mechanism in RRC inactive state, the eDRX cycle of the redcap UE in RRC inactive state may not necessarily be less than or equal to 10.24 s, but may be greater than 10.24 s. A longer eDRX cycle reduces the receptions of NAS messages by the UE, and even the UE cannot receive any NAS message within an eDRX cycle. In this case, when the number of retransmissions of the NAS message exceeds 4, the core network device considers that the NAS message fails to be transmitted, and the core network device pages the UE. If the UE receives the paging message from the core network device, the UE needs to enter RRC idle state, and then initiates random access in RRC idle state. It is clearly that, this process causes a relatively large latency, and consumes a relatively large quantity of transmission resources.

In view of this, the method in embodiments of this application is provided. In embodiments of this application, the access network device and the core network device can negotiate to determine a second cycle. The second cycle is an eDRX cycle that can be configured for a first terminal device to use in RRC inactive state. In this manner, a relatively proper eDRX cycle may be provided based on conditions of the access network device and the core network device. Therefore, if the core network device is to send a NAS message to the first terminal device, the NAS message may be sent according to the second cycle. In this way, regardless of whether the second cycle is less than or equal to 10.24 s or greater than 10.24 s, the first terminal device can properly receive the NAS message from the core network device according to the second cycle. This increases a probability of the reception of the NAS message by the terminal device, reduces a packet loss rate of the NAS message, and accordingly reduces a transmission latency of the NAS message.

The technical solutions provided in embodiments of this application may be applied to a 4G system, for example, an LTE system, or may be applied to a 5G system, for example, an NR system, or may be applied to a next generation mobile communication system or another similar communication system. This is not specifically limited.

Figure 3:
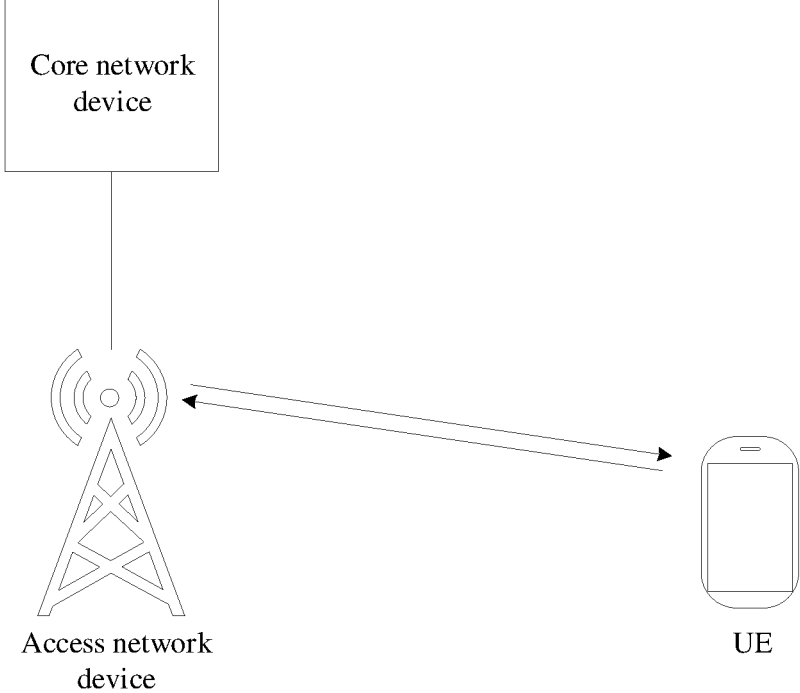
FIG. 3 is a schematic diagram of an application scenario according to an embodiment of this application.

FIG. 3 shows an application scenario according to an embodiment of this application. FIG. 3 includes an access network device, a core network device, and UE. The access network device works, for example, in an evolved universal mobile telecommunications system terrestrial radio access (evolved UMTS terrestrial radio access, E-UTRA) system, or in an NR system, or in a next-generation communication system or another communication system. The access network device is, for example, a base station. The access network device corresponds to different devices in different systems. For example, the access network device may correspond to an eNB in a 4G system, and corresponds to a 5G access network device, for example, a gNB, in a 5G system. Certainly, the technical solutions provided in embodiments of this application may also be applied to a future mobile communication system. Therefore, the access network device in FIG. 3 may also correspond to a network device in the future mobile communication system. In FIG. 3, an example in which the access network device is the base station is used. Actually, with reference to the foregoing descriptions, the access network device may alternatively be a device such as an RSU. In addition, the UE in FIG. 3 is a mobile phone, for example. Actually, it can be learned from the foregoing description of the UE that the UE in embodiments of this application is not limited to the mobile phone.

In addition, for ease of description, embodiments to be described below are all applied, for example, to the architecture shown in FIG. 3. For example, an access network device described in the following embodiments is, for example, the access network device in the network architecture shown in FIG. 3, a core network device described in the following embodiments is, for example, the core network device in the network architecture shown in FIG. 3, and UE described in the following embodiments may be the UE in the network architecture shown in FIG. 3. In addition, the core network device described in the following embodiments is, for example, an AMF, or may be another device located on a core network side.

With reference to the accompanying drawings, the following describes the method provided in embodiments of this application. In the accompanying drawings corresponding to embodiments of this application, all steps indicated by dashed lines are optional steps.

Figure 4:
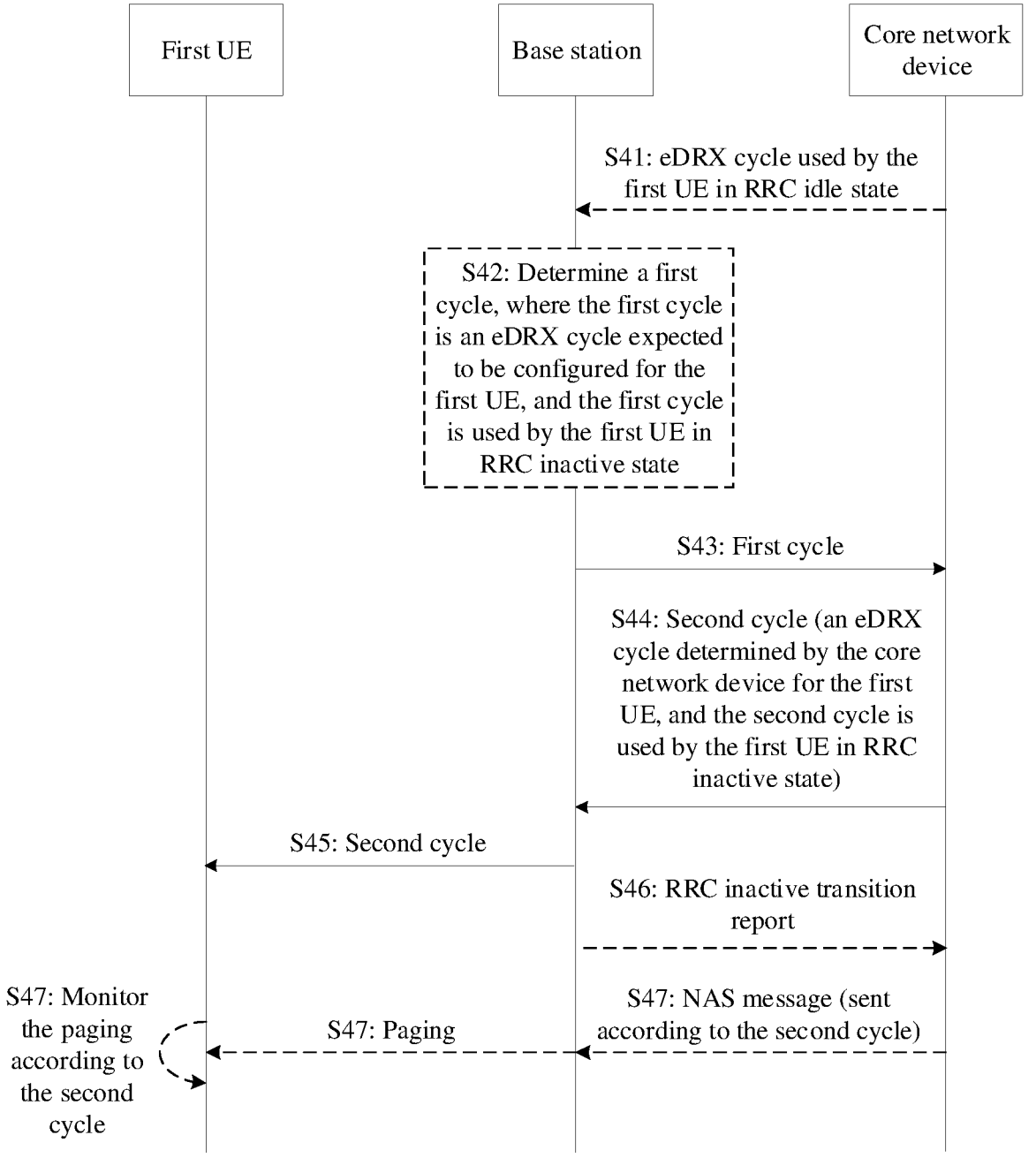
FIG. 4 is a flowchart of a first communication method according to an embodiment of this application.

An embodiment of this application provides a first communication method. FIG. 4 is a flowchart of the method.

S41: A core network device sends first information, and correspondingly, an access network device receives the first information from the core network device.

The first information includes, for example, an eDRX cycle used by first UE in RRC idle state. Optionally, the first information may further include information such as a UE specific DRX cycle.

For example, the first UE is in RRC idle state. If the core network device obtains downlink data of the first UE (for example, the core network device receives the downlink data from another device, or the core network device generates the downlink data), the core network device may send a core network paging message for paging the first UE, where the first information may be included in the core network paging message. For example, the core network paging message includes a paging eDRX cycle information information element (paging eDRX information IE), and the eDRX cycle used by the first UE in RRC idle state may be included in the information element (information element, IE). In addition, if the first information further includes the UE specific DRX cycle, the UE specific DRX cycle may be included in the paging DRX IE of the core network paging message. If the first information is included in the core network paging message, after receiving the core network paging message, the first UE may initiate random access to the access network device, so as to transition from RRC idle state to RRC connected state.

Alternatively, the core network device may send the first information to the access network device by using another message, provided that the message is a message related to the first UE (for example, the message includes an identifier of the first UE). A type of the message is not limited.

S42: The access network device determines a first cycle, where the first cycle is an eDRX cycle that the access network device expects to configure for the first UE, and the first cycle is used by the first UE in RRC inactive state.

After receiving the first information, the access network device may determine the first cycle based on the first information. For example, the access network device may determine the first cycle based on the eDRX cycle used by the first UE in RRC idle state. For example, a time length of the first cycle determined by the access network device may be less than or equal to a time length of the eDRX cycle used by the first UE in RRC idle state.

S43: The access network device sends a first message to the core network device, and correspondingly, the core network device receives the first message from the access network device. The first message includes the first cycle.

For example, after receiving the paging message, the access network device may further send the paging message to the first UE in addition to determining the first cycle. Correspondingly, the first UE receives the paging message from the access network device. After receiving the paging message, the first UE may initiate an RRC connection establishment procedure to the access network device based on the paging message, to establish an RRC connection to the access network device. After the first UE successfully establishes the RRC connection to the access network device, the first uplink NAS message initiated by the first UE may be sent to the core network device by using an initial UE message (initial UE message). For example, the initial UE message may include information such as an attach request (attach request), user location information (user location information), an RRC establishment cause (RRC establishment cause), and an authentication indication (authenticated indication). The attach request may include information included in the NAS message from the first UE. In this embodiment of this application, the first cycle may be included in the initial UE message. In other words, the initial UE message may be used as the first message.

For example, an IE is added to the initial UE message, for example, referred to as a first IE, and the first cycle may be carried by the first IE. Alternatively, the access network device may send the first cycle to the core network device by using another message. In other words, the first message may be another message different from the initial UE message.

S44: The core network device sends a second message to the access network device, and correspondingly, the access network device receives the second message from the core network device. The second message includes a second cycle.

After receiving the first cycle, the core network device may determine the second cycle, where the second cycle is an eDRX cycle that is determined by the core network device for the first UE to use in RRC inactive state. For example, the core network device may determine whether the first cycle can be configured for the first UE, or determine whether the core network device can accept the first cycle as the eDRX cycle used by the first UE in RRC inactive state. If the core network device determines that the first cycle can be configured for the first UE, the second cycle and the first cycle are the same cycle. For example, a time length of the second cycle is equal to the time length of the first cycle. However, if the core network device determines that the first cycle cannot be configured for the first UE, the core network device may re-determine, for the first UE, the second cycle acceptable to the core network device. In this case, the second cycle and the first cycle are different eDRX cycles. For example, the time length of the second cycle is not equal to the time length of the first cycle.

In an optional implementation, the core network device may determine, based on NAS timing information, whether the first cycle can be configured for the first UE, or the core network device may determine the second cycle based on the NAS timing information and the first cycle. For example, if the core network device determines that the first cycle can adapt to the current NAS timing information, the core network device determines that the first UE can use the first cycle, and the time length of the second cycle is equal to the time length of the first cycle; or if the core network device determines that the first cycle cannot adapt to the current NAS timing information, but if the NAS timing information is adjusted, the first cycle can adapt to the adjusted NAS timing information, the core network device determines that the first UE can use the first cycle, and the time length of the second cycle is equal to the first cycle; or if the core network device determines that the first cycle cannot adapt to the current NAS information, and even if the NAS timing information is adjusted, the first cycle cannot adapt to the adjusted NAS timing information (because the NAS timing information cannot be adjusted by the core network device in an unrestricted manner, and can be adjusted only to a specific extent, the first cycle cannot be adapted even if the NAS timing information is adjusted), the core network device determines that the first UE cannot use the first cycle, and the time length of the second cycle is not equal to the time length of the first cycle. For example, the time length of the second cycle is less than the time length of the first cycle, but the time length of the second cycle may be equal to a maximum time length determined based on the NAS timing information.

The NAS timing information may include a minimum retransmission time interval of the NAS message, or include a maximum number of retransmissions of the NAS message, or include a minimum retransmission time interval of the NAS message and a maximum number of retransmissions of the NAS message. If the NAS timing information includes the minimum retransmission time interval of the NAS message, the adjustment of the NAS timing information by the core network device refers to adjusting the minimum retransmission time interval of the NAS message. For example, the minimum retransmission time interval of the NAS message may be increased or decreased. To make the eDRX cycle configured for the UE more flexible, the minimum retransmission time interval of the NAS message may be usually increased. However, the core network device has an acceptance limit. Therefore, the minimum retransmission time interval of the NAS message cannot be infinitely increased, but has an upper limit for adjustment. Alternatively, if the NAS timing information includes the maximum number of retransmissions of the NAS message, the adjustment of the NAS timing information by the core network device refers to adjusting the maximum number of retransmissions of the NAS message. For example, the maximum number of retransmissions of the NAS message may be increased or decreased. To make the eDRX cycle configured for the UE more flexible, the maximum number of retransmissions of the NAS message may be usually increased. However, the core network device has an acceptance limit. Therefore, the maximum number of retransmissions of the NAS message cannot be infinitely increased, but has an upper limit for adjustment. Alternatively, if the NAS timing information includes the minimum retransmission time interval of the NAS message and the maximum number of retransmissions of the NAS message, the adjustment of the NAS timing information by the core network device may include adjusting the minimum retransmission time interval of the NAS message, or adjusting the maximum number of retransmissions of the NAS message, or adjusting both the minimum retransmission time interval of the NAS message and the maximum number of retransmissions of the NAS message.

For ease of understanding, it may be considered that the core network device may determine a first threshold based on the NAS timing information. For example, the first threshold is a maximum time length corresponding to the NAS timing information, or the first threshold is a maximum eDRX cycle acceptable to the core network device to configure for the terminal device. The first threshold may be determined based on the unadjusted NAS timing information, or may be determined based on the adjusted NAS timing information. If the first threshold is determined based on the adjusted NAS timing information, the first threshold is determined, for example, based on the NAS timing information adjusted with the maximum adjustment amplitude, that is, the first threshold may be considered as a maximum value acceptable to the capability of the core network device. In this case, if the time length of the first cycle is less than or equal to the first threshold, the core network device determines that the first cycle is acceptable, and the second cycle and the first cycle may be the same cycle. For example, the time length of the second cycle is the same as the time length of the first cycle. However, if the time length of the first cycle is greater than the first threshold, the core network device determines that the first cycle is unacceptable. In this case, the core network device may determine the second cycle acceptable to the core network device. The time length of the second cycle may be less than the time length of the first cycle, but the second cycle needs to meet a requirement of the core network device. Therefore, the length of the second cycle may be less than or equal to the first threshold.

For example, the time length of the first cycle is relatively short, for example, the time length of the first cycle is less than or equal to 10.24 s. In this case, the core network device may determine, based on the NAS timing information, that the first UE can use the first cycle. In this case, the core network device can accept that the first UE uses the first cycle, and the time length of the second cycle determined by the core network device may be equal to the time length of the first cycle. For another example, the time length of the first cycle is relatively long. For example, the time length of the first cycle is greater than 10.24 s, and for example, is 20.48 s. The core network device may adjust the NAS timing information. For example, if the adjusted NAS timing information can adapt to the eDRX cycle of 20.48 s, the core network device can accept that the first UE uses the first cycle, and the time length of the second cycle determined by the core network device may be equal to the time length of the first cycle. For still another example, the time length of the first cycle is relatively long, for example, the time length of the first cycle is greater than 10.24 s, and for example, is 40.96 s. The core network device determines that even if the NAS timing information is adjusted with the maximum adjustment amplitude (for example, the minimum retransmission time interval of the NAS message is adjusted to the maximum value acceptable to the core network device, and/or the maximum number of retransmissions of the NAS message is adjusted to the maximum value acceptable to the core network device), the adjusted NAS timing information cannot adapt to the eDRX cycle of 40.96. In this case, the core network device cannot accept that the first UE uses the first cycle, and the time length of the second cycle determined by the core network device may be less than the time length of the first cycle.

After determining the second cycle, the core network device may send the second cycle to the access network device by using the second message. For example, the core network device sends an initial context setup request message to the access network device, and the initial context setup request message may be used as the second message.

For example, the initial context setup request message includes a second IE, and the second IE is, for example, a UE radio capability information element for a paging information element (UE Radio Capability for Paging IE). The second IE may further include another IE. For example, the second IE further includes a third IE, where the third IE is, for example, a UE radio paging information element (UE radio paging information). For example, the second cycle is carried by a first field included in the third IE, and the first field is, for example, a spare (spare) field. For example, the third IE includes one or more spare fields, and the first field may be one of the spare fields. For example, the UE radio paging information is defined as follows:

```
UERadioPagingInformation::=SEQUENCE{
    criticalExtensions      CHOICE{
        C1          CHOICE{
            ueRadioPagingInformation   ueRadioPagingInformation-IEs,
            spare7 NULL,
            spare6 NULL, spare5 NULL, spare4 NULL,
            spare3 NULL, spare2 NULL, spare1 NULL,
    }
    criticalExtensionsFuture      SEQUENCE{ }
    }
}
```

It can be learned that sparer to sparer represent seven spare fields, and the first field may include one or more of the seven spare fields.

Alternatively, the initial context setup request message includes the core network assistance information for RRC inactive. For example, an IE is added to the core network assistance information for RRC inactive, for example, referred to as a fourth IE, and the fourth IE may carry the second cycle.

Alternatively, the core network device may send the second cycle to the access network device by using another message, provided that the message is related to the first UE (for example, the message includes the identifier of the first UE).

According to the foregoing steps, the access network device and the core network device complete negotiation on the eDRX cycle for the first UE in RRC inactive state, and the second cycle is the eDRX cycle that is determined through negotiation and that can be used by the first UE in RRC inactive state.

S45: The access network device sends a third message to the first UE, and correspondingly, the first UE receives the third message from the access network device. The third message includes the second cycle.

The access network device receives the second cycle from the core network device. Because the second cycle is acceptable to the core network device, the core network device sends the NAS message to the first UE according to the second cycle. Therefore, the access network device uses the second cycle as a final value configured for the first UE. The access network device may send the second cycle to the first UE by using the third message, that is, configure the second cycle for the first UE, so that after entering RRC inactive state, the first UE may monitor paging according to the second cycle.

For example, when the access network device does not detect data transmission of the first UE, the access network device may start an RRC connection release timer. If the RRC connection release timer expires, the access network device may send an RRC connection release message to the first UE, to release the first UE to RRC inactive state. For example, the first UE is a mobile phone. If a user does not use the mobile phone temporarily, and the mobile phone enters standby state, there may be no data transmission between the mobile phone and the access network device temporarily. In this case, the access network device does not receive uplink data from the mobile phone for a period of time, and the access network device has no downlink data to be sent to the terminal device. In this case, the access network device may release the mobile phone to RRC inactive state. Optionally, when sending the RRC connection release message to the first UE, the access network device includes the second cycle in the RRC connection release message and sends the RRC connection release message to the first UE. In other words, the RRC connection release message may be used as the third message. The RRC connection release message is used to release the first UE to RRC inactive state, and the second cycle is also used by the first UE in RRC inactive state. Therefore, the second cycle is sent to the first UE by using the RRC connection release message, so that the second cycle can be applied in a relatively timely manner. In addition, the RRC connection release message can not only be used to release the first UE to RRC inactive state, but also be used to configure the second cycle for the first UE, thereby improving message utilization. In addition, because no additional message needs to be sent to configure the second cycle for the first UE, transmission overheads are also reduced.

Alternatively, the access network device may send the second cycle to the first UE by using another message. For example, the access network device may send the second cycle to the first UE by using another message before sending the RRC connection release message to the first UE.

S46: The access network device sends an RRC inactive transition report (RRC inactive transition report) to the core network device, and correspondingly, the core network device receives the RRC inactive transition report from the access network device.

The RRC inactive transition report may indicate that the first UE enters RRC inactive state.

S47: The core network device sends the NAS message to the first UE according to the second cycle, and correspondingly, the first UE monitors the paging according to the second cycle, so as to receive the NAS message.

The core network device may send the NAS message to the first UE when the first UE is in RRC inactive state. After receiving the NAS message, the access network device pages the first UE. The first UE monitors the paging according to the second cycle, and the first UE may receive a paging message from the access network device, where the paging message is an access network paging message. After receiving the paging message, the first UE may respond to the paging message from the access network device. After receiving the response from the first UE, the access network device sends the NAS message to the first UE, so that the first UE obtains the NAS message. For example, if the first UE receives the paging message from the access network device, the first UE may initiate random access to the access network device. If the access network device receives a random access preamble (preamble) from the first UE, it is considered that the response of the first UE is received. After the random access succeeds, the access network device may send the NAS message to the first UE. Alternatively, if the first UE receives the paging message from the access network device, the first UE may not initiate random access, but responds to the access network device in another manner. In addition, after receiving the response from the first UE, the access network device may further send feedback information to the core network device. Because the second cycle is supported by the core network device, the core network device can receive the feedback information within a time specified by the NAS timing information. In this case, the core network device considers that the NAS message is sent successfully, and does not need to page the first UE by using the core network paging message, and the first UE does not need to initiate random access after entering RRC idle state, thereby reducing a transmission latency of the NAS message and reducing transmission overheads.

Optionally, the first UE may be any UE served by the access network device. For example, the first UE is redcap UE. If an eDRX cycle that can be supported by other redcap UE in RRC inactive state is greater than 10.24 s, the technical solution in this embodiment of this application is applicable. In other words, according to the technical solution in this embodiment of this application, suitable eDRX cycles may be configured for different redcap UEs, so that the configured eDRX not only meets a requirement for reception of a NAS message by the UE, but also better meets an actual service requirement of the UE.

In the embodiment shown in FIGS. 4, S41, S42, S46, and S47 are all optional steps and are not mandatory.

According to the method provided in this embodiment of this application, a relatively proper eDRX cycle may be provided for the first UE based on conditions of the access network device and the core network device. Therefore, if the core network device is to send the NAS message to the first UE, the NAS message may be sent according to the second cycle, so that the first UE can properly receive the NAS message from the core network device according to the second cycle. Regardless of whether the second cycle is greater than 10.24 s or less than 10.24 s, a probability of the reception of the NAS message by the UE can be increased by using the method in this embodiment of this application, and a packet loss rate of the NAS message can be reduced. In addition, the core network device does not need to page the first UE because the NAS message fails to be sent, and the first UE does not need to initiate random access after entering RRC idle state, thereby reducing a transmission latency of the NAS message and saving transmission resources.

Figure 5:
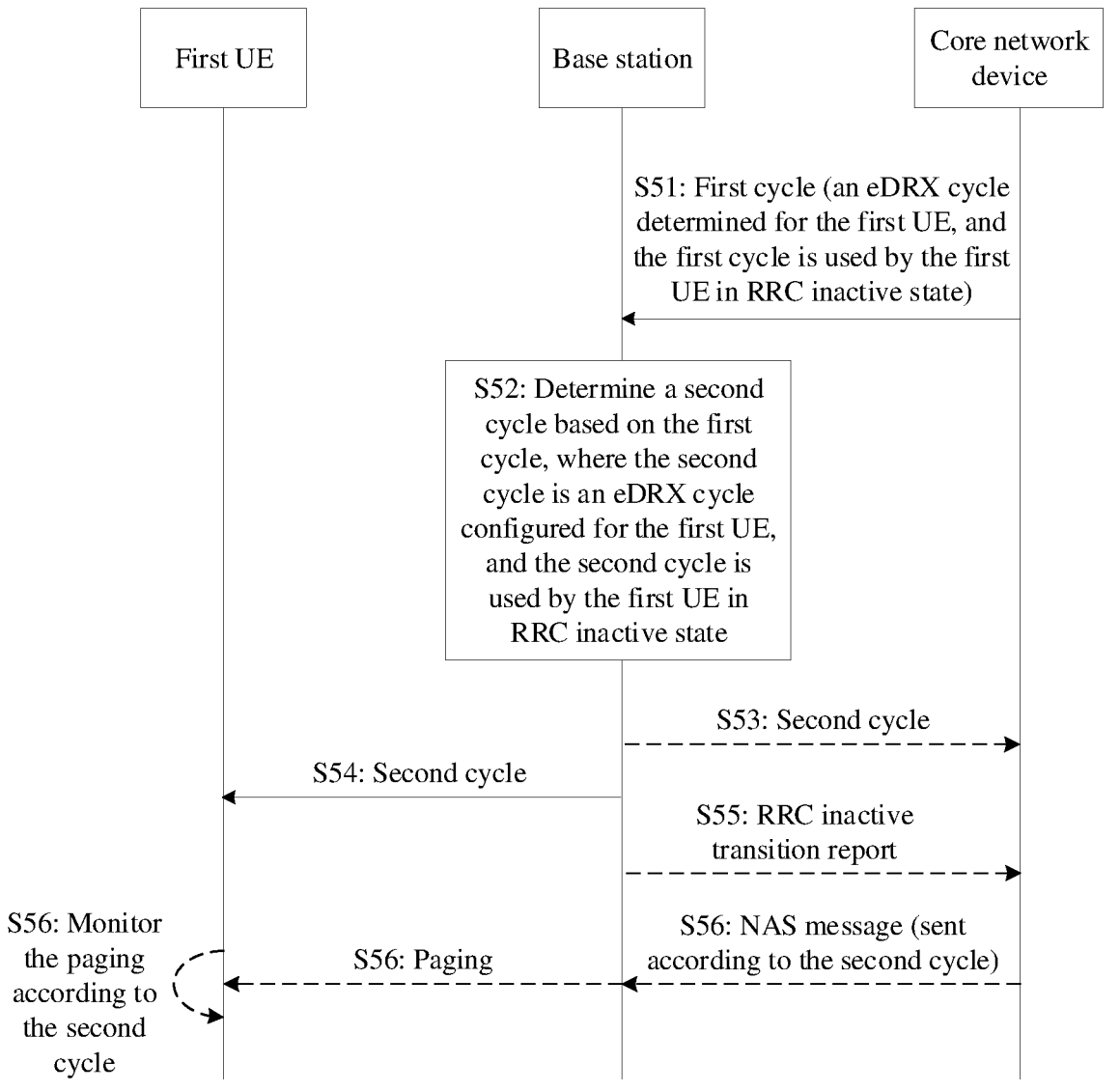
FIG. 5 is a flowchart of a second communication method according to an embodiment of this application.

An embodiment of this application provides a second communication method. FIG. 5 is a flowchart of the method.

S51: A core network device sends a first message to an access network device, and correspondingly, the access network device receives the first message from the core network device. The first message includes a first cycle. The first cycle is an eDRX cycle determined by the core network device for first UE, and the first cycle is used by the first UE in RRC inactive state.

In this embodiment of this application, the core network device may first determine the first cycle acceptable to the core network device, and send the first cycle to the access network device. For example, the core network device may determine the first cycle based on NAS timing information. For content included in the NAS timing information, refer to the description of the embodiment shown in FIG. 4.

The core network device determines the first cycle based on the NAS timing information. For example, the core network device may determine the first cycle based on the unadjusted NAS timing information, that is, the core network device does not adjust the NAS timing information, and determines the first cycle based on the unadjusted NAS timing information. For example, a time length of the first cycle may be less than or equal to a first threshold corresponding to the unadjusted NAS timing information. Alternatively, the core network device may adjust the NAS timing information, and determine the first cycle based on the adjusted NAS timing information. For example, the time length of the first cycle may be less than or equal to the first threshold corresponding to the adjusted NAS timing information. For example, the core network device adjusts the NAS timing information with the maximum adjustment amplitude (for example, adjusts a minimum retransmission time interval of a NAS message to a maximum value acceptable to the core network device, and/or adjusts a maximum number of retransmissions of the NAS message to a maximum value acceptable to the core network device), and determines the first cycle based on the adjusted NAS timing information. In this way, the time length of the determined first cycle is longer, so that the configuration for the first UE by the access network device is more flexible. For the description of the first threshold, refer to the embodiment shown in FIG. 4.

Alternatively, the core network device may determine the first cycle based on the NAS timing information and a service requirement of the first UE. In other words, the core network device may further consider the service requirement of the first UE when determining the first cycle, so that the determined first cycle better meets an application of the first UE. For example, the core network device may determine the first cycle based on the unadjusted NAS timing information and the service requirement of the first UE; or the core network device may adjust the NAS timing information, and determine the first cycle based on the adjusted NAS timing information and the service requirement of the first UE. For the manner of adjusting the NAS timing information by the core network device, refer to the foregoing description.

Alternatively, the core network device may determine the first cycle based on the NAS timing information and a capability of the first UE. In other words, the core network device may further consider the capability of the first UE when determining the first cycle, so that the determined first cycle better meets the capability of the first UE. For example, the core network device may determine the first cycle based on the unadjusted NAS timing information and the capability of the first UE; or the core network device may adjust the NAS timing information, and determine the first cycle based on the adjusted NAS timing information and the capability of the first UE. For the manner of adjusting the NAS timing information by the core network device, refer to the foregoing description.

Alternatively, the core network device may determine the first cycle based on the NAS timing information, the capability of the first UE, and the service requirement of the first UE, or the like. This embodiment of this application imposes no limitation on factors considered when the core network device determines the first cycle.

For example, in a registration process of the first UE, the core network device may send an initial context setup request message corresponding to the first UE to the access network device, and include the first cycle in the initial context setup request message. The initial context setup request message includes core network assistance information for RRC inactive. For example, an IE is added to the core network assistance information for RRC inactive, and the IE may carry the first cycle. Alternatively, the initial context setup request message may include a UE Radio Capability for Paging IE, and the UE Radio Capability for Paging IE may further include UE radio paging information. The second cycle is, for example, carried by a first field included in the UE radio paging information, and the first field is, for example, a spare field. For example, the UE radio paging information includes one or more spare fields, and the first field may be one of the one or more spare fields. For the UE radio paging information, refer to the description of the embodiment shown in FIG. 4.

Alternatively, the core network device may send the first cycle to the access network device by using another message.

S52: The access network device determines a second cycle based on the first cycle.

After receiving the first cycle, the access network device may determine, based on the first cycle, an eDRX cycle that is to be configured for the first UE to use in RRC inactive state. For example, the cycle determined by the access network device is referred to as the second cycle. A time length of the second cycle determined by the access network device needs to fall within a range acceptable to the core network device. Therefore, the time length of the second cycle may be less than or equal to the time length of the first cycle. From this perspective, the first cycle may be considered as a maximum eDRX cycle that is configured for the first UE to use in RRC inactive state and acceptable to the core network device.

For example, the access network device may determine the second cycle based on the first cycle and the capability of the first UE, so that the second cycle can meet the capability of the first UE; or the access network device may determine the second cycle based on the first cycle and the service requirement of the first UE, so that the second cycle can meet the service requirement of the first UE; or the access network device may determine the second cycle based on the first cycle, the capability of the first UE, and the service requirement of the first UE. A factor used by the access network device to determine the second cycle is not limited. Because the access network device can configure an eDRX cycle for the UE based on an actual situation (for example, a service requirement or a capability) of the UE, eDRX cycles that are determined by the access network device for different UEs to use in RRC inactive state may be the same or different.

S53: The access network device sends a second message to the core network device, and correspondingly, the core network device receives the second message from the access network device. The second message includes the second cycle.

After determining the second cycle, the access network device may send the second cycle to the core network device by using the second message, so that the core network device learns of the second cycle actually configured for the first UE, and the core network device may send the NAS message to the first UE in RRC inactive state according to the second cycle.

For example, the access network device sends an initial context setup response message to the core network device, and includes the second cycle in the initial context setup response message. In other words, the initial context setup response message may be used as the second message. For example, an IE is added to the initial context setup response message, and the IE may carry the second cycle.

S54: The access network device sends a third message to the first UE, and correspondingly, the first UE receives the third message from the access network device. The third message includes the second cycle.

The access network device configures the second cycle for the first UE, and then the access network device may send the second cycle to the first UE by using the third message, that is, configure the second cycle for the first UE, so that after entering RRC inactive state, the first UE may monitor paging according to the second cycle.

For more content of S54, refer to S45 in the embodiment shown in FIG. 4.

S55: The access network device sends an RRC inactive transition report to the core network device, and correspondingly, the core network device receives the RRC inactive transition report from the access network device.

The RRC inactive transition report may indicate that the first UE enters RRC inactive state.

Optionally, the access network device may not send the second cycle to the core network device by using the initial context setup response message, but send the RRC inactive transition report including the second cycle to the core network device.

S56: The core network device sends the NAS message to the first UE according to the second cycle, and correspondingly, the first UE monitors the paging according to the second cycle, so as to receive the NAS message.

For more content of S56, refer to S47 in the embodiment shown in FIG. 4.

Optionally, the first UE may be any UE served by the access network device. For example, the first UE is redcap UE. If an eDRX cycle that can be supported by other redcap UE in RRC inactive state is greater than 10.24 s, the technical solution in this embodiment of this application is applicable. For example, the core network device may determine the first cycle for the UE based on the NAS timing information and a service requirement of the UE. In this case, if service requirements of different UEs are different, the first cycle determined by the core network device for the different UEs may be different, and correspondingly, the second cycle configured by the access network device for the different UEs may be different. For another example, the core network device may determine the first cycle for the UE based on the NAS timing information and the capability of the UE. In this case, if different UEs have different capabilities, the first cycle determined by the core network device for the different UEs may be different, and correspondingly, the second cycle configured by the access network device for the different UEs may be different. Alternatively, even if the first cycle determined by the core network device for the different UEs is the same (for example, if the core network device determines the first cycle only based on the NAS timing information, the first cycle determined by the core network device for the different UEs may be the same), when determining the second cycle for UE, the access network device may determine the second cycle based on the first cycle and a capability of the UE, or may determine the second cycle based on the first cycle and a service requirement of the UE. Therefore, the second cycle configured by the access network device for the different UEs may also be different. It can be learned that according to the technical solution in this embodiment of this application, a suitable eDRX cycle may be configured for each UE, so that the configured eDRX not only meets a requirement for reception of a NAS message by the UE, but also better meets an actual service requirement of the UE.

Alternatively, S53 may not be performed. To be specific, the access network device does not need to send the second cycle to the core network device, and the access network device only needs to configure the second cycle for the first UE based on the first cycle, and configure the second cycle for the first UE. In this case, the message sent by the access network device to the first UE in S54 may be referred to as the second message, and the second message is, for example, an RRC connection release message, or may be another message. In this case, S56 may be replaced by the following: The core network device sends the NAS message to the first UE according to the first cycle, and correspondingly, the first UE still monitors the paging according to the second cycle. In this manner, a process of interaction between the access network device and the core network device is reduced, and signaling overheads are reduced. In addition, because the time length of the second cycle is less than or equal to the time length of the first cycle, the core network device sends the NAS message according to the first cycle, and the first UE can detect the NAS message in the eDRX cycle, which does not affect the reception of the NAS message by the first UE.

In the embodiment shown in FIGS. 5, S53, S55, and S56 are all optional steps and are not mandatory.

In this embodiment of this application, the core network device first notifies the access network device of the upper limit acceptable to the core network device, so that the access network device can more accurately configure the eDRX cycle for the first UE to use in RRC inactive state, and a process in which the access network device re-determines the eDRX cycle configured for the first UE is reduced. The access network device also notifies the core network device of the finally determined second cycle. Therefore, if the core network device is to send the NAS message to the first UE, the NAS message may be sent according to the second cycle, so that the first UE can properly receive the NAS message from the core network device according to the second cycle. Regardless of whether the second cycle is greater than 10.24 s or less than 10.24 s, a probability of the reception of the NAS message by the UE can be increased by using the method in this embodiment of this application, and a packet loss rate of the NAS message can be reduced. In addition, the core network device does not need to page the first UE because the NAS message fails to be sent, and the first UE does not need to initiate random access after entering RRC idle state, thereby reducing a transmission latency of the NAS message and saving transmission resources. In addition, in this embodiment of this application, the core network device may use the NAS timing information as a factor to provide an eDRX cycle upper limit (for example, the first cycle) as a reference for the access network device, and the access network device does not need to consider the eDRX cycle used by the first UE in RRC idle state to configure the eDRX cycle for the first UE to use in RRC inactive state, so that a manner of configuring the eDRX cycle for the UE is more flexible.

Figure 6:
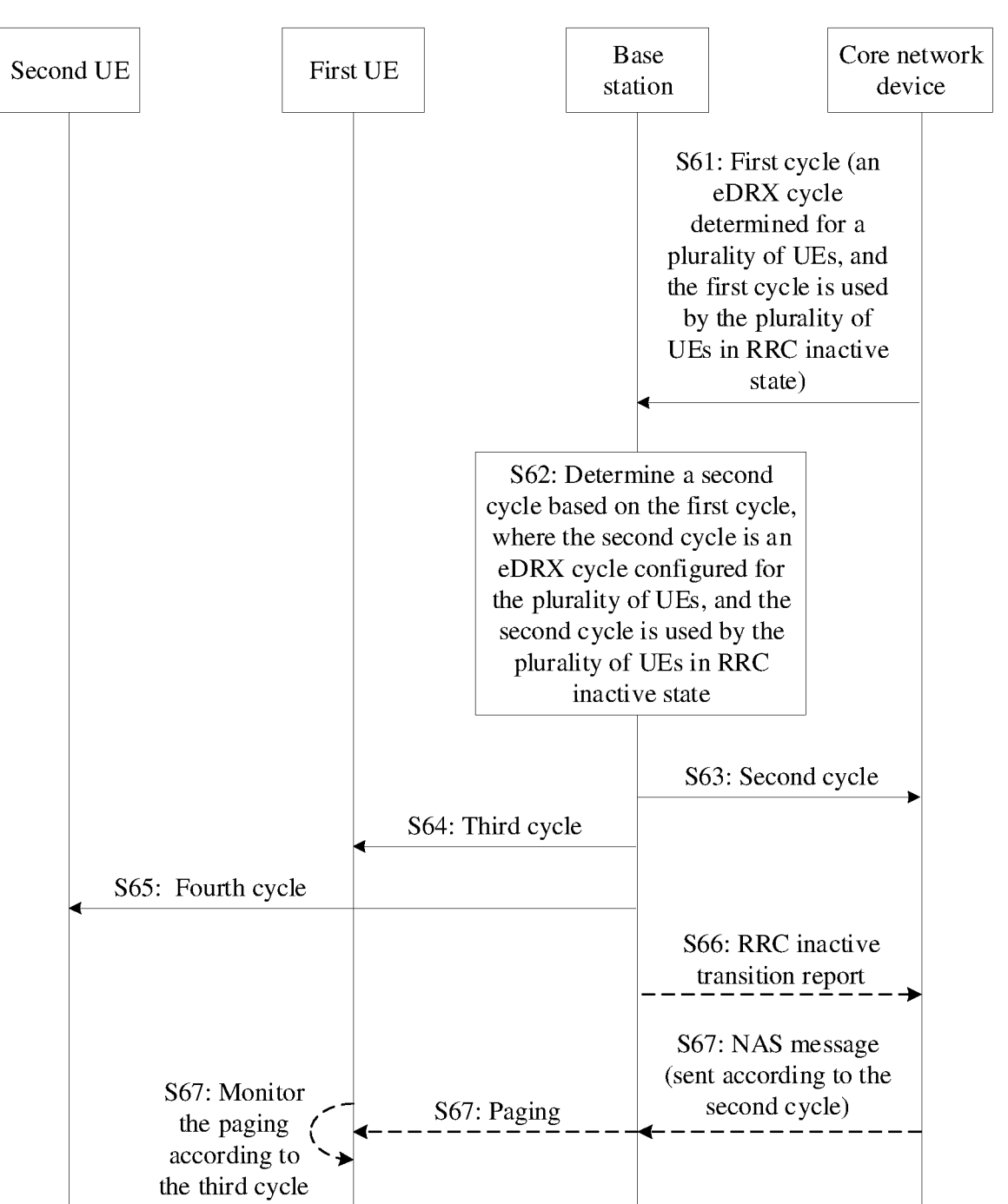
FIG. 6 is a flowchart of a third communication method according to an embodiment of this application.

An embodiment of this application provides a third communication method. FIG. 6 is a flowchart of the method.

S61: A core network device sends a first message to an access network device, and correspondingly, the access network device receives the first message from the core network device. The first message includes a first cycle. The first cycle is a maximum eDRX cycle determined by the core network device for a plurality of UEs, and the first cycle is an eDRX cycle used by the plurality of UEs in RRC inactive state. It may be understood that eDRX cycles finally configured by the access network device for the plurality of UEs may be the same or different, but all the eDRX cycles need to be less than or equal to the first cycle.

The first cycle in this embodiment of this application corresponds to a plurality of UEs. For example, the plurality of UEs are all redcap UEs. The plurality of UEs may include all of the redcap UEs served by the core network device and the access network device, or may include some of the redcap UEs served by the core network device and the access network device. For example, the core network device may determine the first cycle based on NAS timing information. For content such as how the core network device determines the first cycle based on the NAS timing information, refer to the description of the embodiment shown in FIG. 5.

For example, the core network device is an AMF. The AMF may send an AMF configuration update (AMF configuration update) message to the access network device, and include the first cycle in the AMF configuration update message. In other words, the AMF configuration update message may be used as the first message. For example, a first IE is added to the AMF configuration update message, and the first IE may be used to carry the first cycle.

Alternatively, when the access network device has not yet established a connection to the core network device, the access network device may send an NG setup request (NG setup request) message to the core network device, to request to establish an NG interface connection to the core network device. After receiving the NG setup request message from the access network device, the core network device may send an NG setup response (NG setup response) message to the access network device, to establish the NG interface connection to the access network device. In this case, optionally, the core network device may also send the NG setup response message including the first cycle to the access network device. In other words, the NG setup response message may be used as the first message. For example, a second IE is added to the NG setup response message, and the second IE may be used to carry the first cycle.

Alternatively, the core network device may send the first cycle to the access network device by using another message. In this embodiment of this application, the first cycle corresponds to a plurality of UEs, or does not specifically correspond to one or several UEs. Therefore, the message for sending the first cycle may be not related to a specific UE (for example, the message does not include an identifier of any UE).

S62: The access network device determines a second cycle based on the first cycle.

After receiving the first cycle, the access network device may determine, based on the first cycle, a maximum eDRX cycle that is to be configured for the plurality of UEs to use in RRC inactive state. For example, the cycle determined by the access network device is referred to as the second cycle. A time length of the second cycle determined by the access network device needs to fall within a range acceptable to the core network device. Therefore, the time length of the second cycle may be less than or equal to a time length of the first cycle. In other words, the core network device determines an eDRX cycle upper limit (that is, the first cycle) for the plurality of UEs, and the access network device may determine, based on the first cycle, an eDRX cycle upper limit (that is, the second cycle) actually configured for the plurality of UEs.

Whether the time length of the second cycle is equal to or less than the length of the first cycle, or how much the time length of the second cycle is less than the time length of the first cycle depends on implementation of the access network device. For example, the access network device may determine the second cycle based on the first cycle, and such a determining manner is relatively simple; or the access network device may determine the second cycle based on the first cycle and service requirements of the plurality of UEs, so that the second cycle can meet both requirements of the plurality of UEs for receiving NAS messages and service requirements of the plurality of UEs; or the access network device may determine the second cycle based on the first cycle and capabilities of the plurality of UEs, so that the second cycle can meet both requirements of the plurality of UEs for receiving NAS messages and actual capabilities of the plurality of UEs; or the access network device may determine the second cycle based on the first cycle, service requirements of the plurality of UEs, capabilities of the plurality of UEs, or the like.

S63: The access network device sends a second message to the core network device, and correspondingly, the core network device receives the second message from the access network device. The second message includes the second cycle.

After determining the second cycle, the access network device may send the second cycle to the core network device by using the second message, so that the core network device learns of the second cycle actually configured for the plurality of UEs. Therefore, for any UE in the plurality of UEs, when the UE is in RRC inactive state, if the core network device is to send a NAS message to the UE, the core network device may send the NAS message according to the second cycle. It can be learned that in this embodiment of this application, regardless of which UE in the plurality of UEs, the core network device only needs to send the NAS message to the UE in RRC inactive state according to one eDRX cycle (that is, the second cycle), and the core network device does not need to maintain a different NAS message for each UE, thereby simplifying implementation of the core network device.

For example, the access network device sends an AMF configuration update acknowledgment (AMF configuration update acknowledge) message to the core network device, and includes the second cycle in the AMF configuration update acknowledgment message. In other words, the AMF configuration update message may be used as the second message. Alternatively, the access network device may send the second cycle to the core network device by using another message. For example, after the access network device establishes an NG interface connection to the core network device, the access network device may send a corresponding message to the core network device through the NG interface, and include the second cycle in the message. The technical solution in this embodiment of this application corresponds to the plurality of UEs, or is not specifically for one or several UEs. Therefore, the message for sending the second cycle may be not related to the UE. For example, the message does not include an identifier of the UE.

S64: The access network device sends a third message to first UE, and correspondingly, the first UE receives the third message from the access network device. The third message includes a third cycle.

The second cycle determined by the access network device is an eDRX cycle upper limit that can be configured for the plurality of UEs. Further, the access network device may separately configure, based on the second cycle and some other factors, eDRX cycles for different UEs in the plurality of UEs to use in RRC inactive state. Time lengths of the eDRX cycles that are configured by the access network device for the different UEs in the plurality of UEs to use in RRC inactive state may be the same or different.

For example, for one of the plurality of UEs, the access network device may determine, based on the second cycle, an eDRX cycle used by the UE in RRC inactive state, and such a determining manner is relatively simple; or the access network device may determine, based on the second cycle and a service of the UE, an eDRX cycle used by the UE in RRC inactive state, so that the configured eDRX cycle can meet both a requirement for reception of a NAS message by the UE and a service transmission requirement of the UE; or the access network device may determine, based on the second cycle and a capability of the UE, an eDRX cycle used by the UE in RRC inactive state, so that the determined eDRX cycle can meet both requirements of the plurality of UEs for receiving NAS messages and both an actual capability of the UE; or the access network device may determine, based on the second cycle, a service requirement of the UE, and a capability of the UE, an eDRX cycle used by the UE in RRC inactive state, or the like.

The first UE is one of the plurality of UEs. For example, the access network device configures the third cycle for the first UE according to one of the foregoing configuration manners, and the third cycle is an eDRX cycle for the first UE to use in RRC inactive state. The access network device may send the third cycle to the first UE by using the third message, that is, configure the third cycle for the first UE, so that after entering RRC inactive state, the first UE may monitor paging according to the third cycle. A time length of the third cycle is less than or equal to the time length of the second cycle.

For more content of S64, for example, a message that may be used to implement the third message, refer to S45 in the embodiment shown in FIG. 4.

S65: The access network device sends a fourth message to second UE, and correspondingly, the second UE receives the fourth message from the access network device. The fourth message includes a fourth cycle.

The second UE is one of the plurality of UEs, and the first UE and the second UE are different UEs. For example, the access network device configures the fourth cycle for the second UE, and the fourth cycle is an eDRX cycle for the second UE to use in RRC inactive state. The access network device may send the fourth cycle to the second UE by using the fourth message, that is, configure the fourth cycle for the second UE, so that after entering RRC inactive state, the second UE may monitor paging according to the fourth cycle. A time length of the fourth cycle is less than or equal to the time length of the second cycle. In addition, the time length of the third cycle may be the same as or different from the time length of the fourth cycle.

For more content of S65, for example, how the access network device determines the fourth cycle and a message that may be used to implement the fourth message, refer to S45 in the embodiment shown in FIG. 4.

In addition, if the plurality of UEs include other UE in addition to the first UE and the second UE, the access network device may separately configure an eDRX cycle for the other UE. A configuration manner is similar, and details are not described again.

S66: The access network device sends an RRC inactive transition report to the core network device, and correspondingly, the core network device receives the RRC inactive transition report from the access network device.

The RRC inactive transition report may indicate that the first UE enters RRC inactive state. Among the plurality of UEs, different UEs may enter RRC inactive state at the same time or different times. In this embodiment of this application, only an example in which the first UE enters RRC inactive state is used for description herein.

S66 may occur before S65, or S66 and S65 may occur simultaneously, or S66 may occur after S65.

S67: The core network device sends a NAS message to the first UE according to the second cycle, and correspondingly, the first UE monitors the paging according to the third cycle, so as to receive the NAS message.

In this embodiment of this application, regardless of a length of the eDRX configured by the access network device for the UE, the core network device sends the NAS message to the UE according to the second cycle. Therefore, the core network device does not need to maintain different eDRX cycles for different UEs, and implementation of the core network device can be simplified.

For example, the third cycle is configured by the access network device based on the second cycle and the service requirement of the first UE. Because the time length of the third cycle is less than or equal to the time length of the second cycle, if the core network device sends the NAS message according to the second cycle, the first UE can monitor the paging from the access network device within the third cycle, so that the first UE can correctly receive the NAS message, and a NAS message reception requirement can be met. In addition, because the third cycle is related to the service requirement of the first UE, the service transmission requirement of the first UE can also be met when the first UE monitors the paging according to the third cycle.

For more content of S67, refer to S47 in the embodiment shown in FIG. 4.

In addition, if the access network device sends the fourth cycle to the second UE by using an RRC connection release message, where the RRC connection release message is used to release the second UE to RRC inactive state, the second UE also enters RRC inactive state based on the RRC connection release message. In this case, the access network device also sends, to the core network device, an RRC inactive transition report corresponding to the second UE, to indicate that the second UE enters RRC inactive state. If the core network device is to send the NAS message to the second UE in RRC inactive state, the core network device sends the NAS message according to the second cycle, and the second UE monitors the paging according to the fourth cycle. Because the processes are similar, details are not described again.

In the embodiment shown in FIGS. 6, S66 and S67 are both optional steps and are not mandatory.

In this embodiment of this application, the core network device first notifies the access network device of the upper limit acceptable to the core network device, so that the access network device can more accurately configure the eDRX cycles for the plurality of UEs to use in RRC inactive state, and a process in which the access network device re-determines the eDRX cycles configured for the plurality of UEs is reduced. The access network device also notifies the core network device of the finally determined second cycle. Therefore, if the core network device is to send the NAS message to any one of the plurality of UEs, the NAS message may be sent according to the second cycle, so that the plurality of UEs can properly receive the NAS message from the core network device. Regardless of whether the second cycle is greater than 10.24 s or less than 10.24 s, a probability of the reception of the NAS message by the UE can be increased by using the method in this embodiment of this application, and a packet loss rate of the NAS message can be reduced. The core network device does not need to page the first UE because the NAS message fails to be sent, and the first UE does not need to initiate random access after entering RRC idle state, thereby reducing a service transmission latency and saving transmission resources. In addition, for any one of the plurality of UEs, the core network device may send the NAS message according to the second cycle, and there is no need to maintain different eDRX cycles for different UEs, thereby simplifying an implementation process of the core network device.

Figure 7:
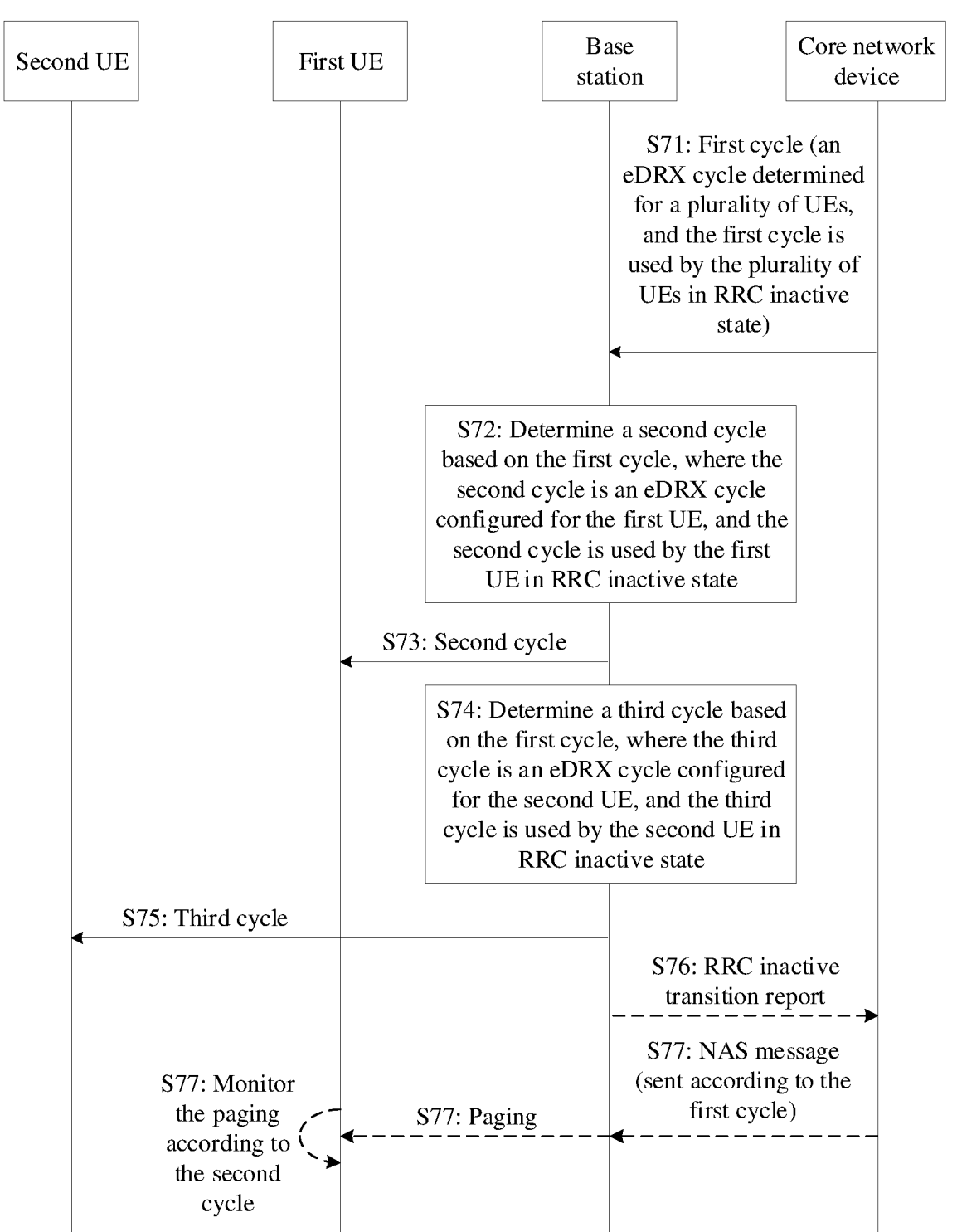
FIG. 7 is a flowchart of a fourth communication method according to an embodiment of this application.

An embodiment of this application provides a fourth communication method. FIG. 7 is a flowchart of the method.

S71: A core network device sends a first message to an access network device, and correspondingly, the access network device receives the first message from the core network device. The first message includes a first cycle. The first cycle is a maximum eDRX cycle determined by the core network device for a plurality of UEs, and the first cycle is an eDRX cycle used by the plurality of UEs in RRC inactive state. It may be understood that eDRX cycles finally configured by the access network device for the plurality of UEs may be the same or different, but all the eDRX cycles need to be less than or equal to the first cycle.

For more content of S71, refer to the description of S61 in the embodiment shown in FIG. 6.

S72: The access network device determines a second cycle for first UE based on the first cycle.

After receiving the first cycle, the access network device may determine, based on the first cycle, eDRX cycles for different UEs to use in RRC inactive state. Optionally, the access network device may separately configure, based on the first cycle and some other factors, eDRX cycles for different UEs in the plurality of UEs to use in RRC inactive state. Time lengths of the eDRX cycles that are configured by the access network device for the different UEs in the plurality of UEs to use in RRC inactive state may be the same or different.

For example, for one of the plurality of UEs, the access network device may determine, based on the first cycle, the eDRX cycle used by the UE in RRC inactive state, and such a determining manner is relatively simple; or the access network device may determine, based on the first cycle and a service of the UE, the eDRX cycle used by the UE in RRC inactive state, so that the configured eDRX cycle can meet both a requirement for reception of a NAS message by the UE and a service transmission requirement of the UE; or the access network device may determine, based on the first cycle and a capability of the UE, the eDRX cycle used by the UE in RRC inactive state, so that the determined eDRX cycle can meet both requirements of the plurality of UEs for receiving NAS messages and an actual capability of the UE; or the access network device may determine, based on the first cycle, a service requirement of the UE, and a capability of the UE, the eDRX cycle used by the UE in RRC inactive state, or the like.

The first UE is one of the plurality of UEs. For example, the access network device configures the second cycle for the first UE according to one of the foregoing configuration manners, and the second cycle is the eDRX cycle used by the first UE in RRC inactive state.

S73: The access network device sends a second message to the first UE, and correspondingly, the first UE receives the second message from the access network device. The second message includes the second cycle.

The access network device may send the second cycle to the first UE by using the second message, that is, configure the second cycle for the first UE, so that after entering RRC inactive state, the first UE may monitor paging according to the second cycle. A time length of the second cycle is less than or equal to a time length of the first cycle.

For more content of S73, for example, a message that may be used to implement the second message, refer to S45 in the embodiment shown in FIG. 4.

S74: The access network device determines a third cycle for second UE based on the first cycle.

The second UE is one of the plurality of UEs. For example, the access network device configures the third cycle for the second UE according to one of the foregoing configuration manners, and the third cycle is an eDRX cycle for the second UE to use in RRC inactive state. For more content of S74, for example, how the access network device determines the third cycle, refer to the description of S72.

S75: The access network device sends a third message to the second UE, and correspondingly, the second UE receives the third message from the access network device. The third message includes the third cycle.

The access network device may send the third cycle to the second UE by using the third message, that is, configure the third cycle for the second UE, so that after entering RRC inactive state, the second UE may monitor paging according to the third cycle. A time length of the third cycle is less than or equal to a time length of the first cycle.

For more content of S75, for example, a message that may be used to implement the third message, refer to S45 in the embodiment shown in FIG. 4.

In addition, if the plurality of UEs include other UE in addition to the first UE and the second UE, the access network device may separately configure an eDRX cycle for the other UE. A configuration manner is similar, and details are not described again.

S76: The access network device sends an RRC inactive transition report to the core network device, and correspondingly, the core network device receives the RRC inactive transition report from the access network device.

The RRC inactive transition report may indicate that the first UE enters RRC inactive state. Among the plurality of UEs, different UEs may enter RRC inactive state at the same time or different times. In this embodiment of this application, only an example in which the first UE enters RRC inactive state is used for description herein.

S77: The core network device sends a NAS message to the first UE according to the first cycle, and correspondingly, the first UE monitors the paging according to the second cycle, so as to receive the NAS message.

In this embodiment of this application, regardless of a length of the eDRX configured by the access network device for the UE, the core network device sends the NAS message to the UE according to the first cycle. Therefore, the core network device does not need to maintain different eDRX cycles for different UEs, and implementation of the core network device can be simplified.

For example, the second cycle is configured by the access network device based on the first cycle and the service requirement of the first UE. Because a time length of the second cycle is less than or equal to the time length of the first cycle, if the core network device sends the NAS message according to the first cycle, the first UE can monitor the paging from the access network device within the second cycle, so that the first UE can correctly receive the NAS message, and a NAS message reception requirement can be met. In addition, because the second cycle is related to a service requirement of the first UE, the service transmission requirement of the first UE can also be met when the first UE monitors the paging according to the second cycle.

For more content of S77, refer to S47 in the embodiment shown in FIG. 4.

In addition, if the access network device sends the third cycle to the second UE by using an RRC connection release message, where the RRC connection release message is used to release the second UE to RRC inactive state, the second UE also enters RRC inactive state based on the RRC connection release message. In this case, the access network device also sends, to the core network device, an RRC inactive transition report corresponding to the second UE, to indicate that the second UE enters RRC inactive state. If the core network device is to send the NAS message to the second UE in RRC inactive state, the core network device also sends the NAS message according to the first cycle, and the second UE monitors the paging according to the third cycle. Because the processes are similar, details are not described again.

In the embodiment shown in FIGS. 7, S76 and S77 are both optional steps and are not mandatory.

In this embodiment of this application, the core network device notifies the access network device of the upper limit acceptable to the core network device, and the access network device may configure the eDRX cycles for the different UEs based on the upper limit, so that the access network device can more accurately configure the eDRX cycles for the plurality of UEs to use in RRC inactive state, and a process in which the access network device re-determines the eDRX cycles configured for the plurality of UEs is reduced. If the core network device is to send the NAS message to any one of the plurality of UEs, the NAS message may be sent according to the first cycle, so that the plurality of UEs can properly receive the NAS message from the core network device. Regardless of whether the first cycle is greater than 10.24 s or less than 10.24 s, a probability of the reception of the NAS message by the UE can be increased by using the method in this embodiment of this application, and a packet loss rate of the NAS message can be reduced. The core network device does not need to page the first UE because the NAS message fails to be sent, and the first UE does not need to initiate random access after entering RRC idle state, thereby reducing a service transmission latency and saving transmission resources. In addition, for any one of the plurality of UEs, the core network device may send the NAS message according to the second cycle, and there is no need to maintain different eDRX cycles for different UEs, thereby simplifying an implementation process of the core network device.

With reference to the accompanying drawings, the following describes apparatuses configured to implement the foregoing methods in embodiments of this application. Therefore, all the foregoing content may be used in the following embodiments. Repeated content is not described again.

Figure 8:
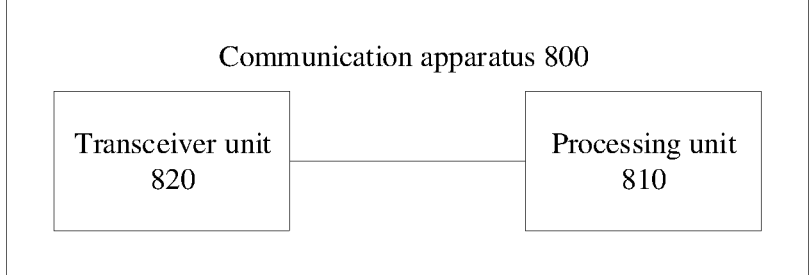
FIG. 8 is a schematic block diagram of a communication apparatus according to an embodiment of this application.

FIG. 8 is a schematic block diagram of a communication apparatus 800 according to an embodiment of this application. For example, the communication apparatus 800 is, for example, a terminal device or a network device. For example, the communication apparatus 800 can implement functions of the first terminal device in the embodiment shown in FIG. 4, the embodiment shown in FIG. 5, the embodiment shown in FIG. 6, or the embodiment shown in FIG. 7. Alternatively, the communication apparatus 800 can implement the functions of the access network device in the embodiment shown in FIG. 4, the embodiment shown in FIG. 5, the embodiment shown in FIG. 6, or the embodiment shown in FIG. 7. Alternatively, the communication apparatus 800 can implement the functions of the core network device in the embodiment shown in FIG. 4, the embodiment shown in FIG. 5, the embodiment shown in FIG. 6, or the embodiment shown in FIG. 7.

The communication apparatus 800 includes a transceiver unit 820 and a processing unit 810. Optionally, the communication apparatus 800 may further include a storage unit. The storage unit, which is not shown in FIG. 7, can communicate with the processing unit 810. Alternatively, the communication apparatus 800 may not include a storage unit, and the storage unit may be located outside the communication apparatus 800. For example, the communication apparatus 800 may be a first terminal device, or may be a chip applied to the first terminal device or another combined device or component that has the functions of the first terminal device. Alternatively, the communication apparatus 800 may be a network device (for example, an access network device or a core network device), or may be a chip applied to the network device or another combined device or component that has the functions of the network device (for example, the access network device or the core network device). When the communication apparatus 800 is the first terminal device or the network device, the processing unit 810 may include a processor, for example, a baseband processor. The baseband processor may include one or more central processing units (central processing unit, CPU). The transceiver unit 820 may be a transceiver, and the transceiver may include an antenna, a radio frequency circuit, and the like. The transceiver may include a transmitter and a receiver, and the transceiver may implement functions of the transmitter and the receiver. Alternatively, the transmitter and the receiver may be two function modules that are separately deployed, but the two function modules are collectively referred to as a transceiver in this embodiment of this application. When the communication apparatus 800 is the component having the functions of the first terminal device or the network device, the transceiver unit 820 may be a radio frequency unit, and the processing unit Bio may be a processor, for example, a baseband processor. When the communication apparatus 800 is a chip system, the transceiver unit 820 may be an input/output interface of the chip (for example, a baseband chip), and the processing unit Bio may be a processor of the chip system, and may include one or more central processing units. It should be understood that the processing unit Bio in this embodiment of this application may be implemented by a processor or a processor-related circuit assembly, and the transceiver unit 820 may be implemented by a transceiver or a transceiver-related circuit assembly.

In an implementation, when the communication apparatus 800 is configured to implement the functions of the first terminal device in the embodiment shown in FIG. 4, the processing unit 810 may be configured to perform all operations performed by the first terminal device in the embodiment shown in FIG. 4 except the receiving and sending operations, and/or configured to support another process of the technology described herein. The transceiver unit 820 may be configured to perform all receiving operations and sending operations, for example, S45 and S47, performed by the first terminal device in the embodiment shown in FIG. 4, and/or configured to support another process of the technology described herein.

In an implementation, when the communication apparatus 800 is configured to implement the functions of the access network device described in the embodiment shown in FIG. 4, the processing unit 810 may be configured to perform all operations, for example, S42, performed by the access network device in the embodiment shown in FIG. 4 except the receiving and sending operations, and/or another process used to support the technology described herein. The transceiver unit 820 may be configured to perform all receiving operations and sending operations, for example, S41 and S43 to S47, performed by the access network device in the embodiment shown in FIG. 4, and/or configured to support another process of the technology described herein.

In an implementation, when the communication apparatus 800 is configured to implement the functions of the core network device in the embodiment shown in FIG. 4, the processing unit 810 may be configured to perform all operations, for example, the operation of determining the second cycle, performed by the core network device in the embodiment shown in FIG. 4 except the receiving and sending operations, and/or another process used to support the technology described herein. The transceiver unit 820 may be configured to perform all receiving operations and sending operations, for example, S41, S43, S44, S46, and S47, performed by the core network device in the embodiment shown in FIG. 4, and/or configured to support another process of the technology described herein.

In an implementation, when the communication apparatus 800 is configured to implement the functions of the first terminal device in the embodiment shown in FIG. 5, the processing unit 810 may be configured to perform all operations performed by the first terminal device in the embodiment shown in FIG. 5 except the receiving and sending operations, and/or configured to support another process of the technology described herein. The transceiver unit 820 may be configured to perform all receiving operations and sending operations, for example, S54 and S56, performed by the first terminal device in the embodiment shown in FIG. 5, and/or configured to support another process of the technology described herein.

In an implementation, when the communication apparatus 800 is configured to implement the functions of the access network device in the embodiment shown in FIG. 5, the processing unit 810 may be configured to perform all operations, for example, S52, performed by the access network device in the embodiment shown in FIG. 5 except the receiving and sending operations, and/or another process used to support the technology described herein. The transceiver unit 820 may be configured to perform all receiving operations and sending operations, for example, S51 and S53 to S56, performed by the access network device in the embodiment shown in FIG. 5, and/or configured to support another process of the technology described herein.

In an implementation, when the communication apparatus 800 is configured to implement the functions of the core network device in the embodiment shown in FIG. 5, the processing unit 810 may be configured to perform all operations, for example, the operation of determining the first cycle, performed by the core network device in the embodiment shown in FIG. 5 except the receiving and sending operations, and/or another process used to support the technology described herein. The transceiver unit 820 may be configured to perform all receiving operations and sending operations, for example, S51, S53, S55, and S56, performed by the core network device in the embodiment shown in FIG. 5, and/or configured to support another process of the technology described herein.

In an implementation, when the communication apparatus 800 is configured to implement the functions of the first terminal device in the embodiment shown in FIG. 6, the processing unit 810 may be configured to perform all operations performed by the first terminal device in the embodiment shown in FIG. 6 except the receiving and sending operations, and/or configured to support another process of the technology described herein. The transceiver unit 820 may be configured to perform all receiving operations and sending operations, for example, S64 and S67, performed by the first terminal device in the embodiment shown in FIG. 6, and/or configured to support another process of the technology described herein.

In an implementation, when the communication apparatus 800 is configured to implement the functions of the access network device in the embodiment shown in FIG. 6, the processing unit 810 may be configured to perform all operations, for example, S62, performed by the access network device in the embodiment shown in FIG. 6 except the receiving and sending operations, and/or another process used to support the technology described herein. The transceiver unit 820 may be configured to perform all receiving operations and sending operations, for example, S61 and S63 to S67, performed by the access network device in the embodiment shown in FIG. 6, and/or configured to support another process of the technology described herein.

In an implementation, when the communication apparatus 800 is configured to implement the functions of the core network device in the embodiment shown in FIG. 6, the processing unit 810 may be configured to perform all operations, for example, the operation of determining the first cycle, performed by the core network device in the embodiment shown in FIG. 6 except the receiving and sending operations, and/or another process used to support the technology described herein. The transceiver unit 820 may be configured to perform all receiving operations and sending operations, for example, S61, S63, S66, and S67, performed by the core network device in the embodiment shown in FIG. 6, and/or configured to support another process of the technology described herein.

In an implementation, when the communication apparatus 800 is configured to implement the functions of the first terminal device in the embodiment shown in FIG. 7, the processing unit 810 may be configured to perform all operations performed by the first terminal device in the embodiment shown in FIG. 7 except the receiving and sending operations, and/or configured to support another process of the technology described herein. The transceiver unit 820 may be configured to perform all receiving operations and sending operations, for example, S73 and S77, performed by the first terminal device in the embodiment shown in FIG. 7, and/or configured to support another process of the technology described herein.

In an implementation, when the communication apparatus 800 is configured to implement the functions of the access network device in the embodiment shown in FIG. 7, the processing unit 810 may be configured to perform all operations, such as S72 and S74, performed by the access network device in the embodiment shown in FIG. 7 except the receiving and sending operations, and/or configured to support another process of the technology described herein. The transceiver unit 820 may be configured to perform all receiving operations and sending operations, for example, S71, S73, and S75 to S77, performed by the access network device in the embodiment shown in FIG. 7, and/or configured to support another process of the technology described herein.

In an implementation, when the communication apparatus 800 is configured to implement the functions of the core network device in the embodiment shown in FIG. 7, the processing unit 810 may be configured to perform all operations, the operation of determining the first cycle, performed by the core network device in the embodiment shown in FIG. 7 except the receiving and sending operations, for example, and/or another process used to support the technology described herein. The transceiver unit 820 may be configured to perform all receiving operations and sending operations, for example, S71, S76, and S77, performed by the core network device in the embodiment shown in FIG. 7, and/or configured to support another process of the technology described herein.

In addition, the transceiver unit 820 may be a function module, and the function module can complete both a sending operation and a receiving operation. For example, the transceiver unit 820 may be configured to perform all sending operations and receiving operations performed by the first terminal device or the network device (for example, the core network device or the access network device) in the embodiment shown in FIG. 4, the embodiment shown in FIG. 5, the embodiment shown in FIG. 6, or the embodiment shown in FIG. 7. For example, when a receiving operation is performed, it may be considered that the transceiver unit 820 is a receiving unit, and when a sending operation is performed, it may be considered that the transceiver unit 820 is a sending unit. Alternatively, the transceiver unit 820 may be two function modules. The transceiver unit 820 may be considered as a collective term for the two function modules. The two function modules include a receiving unit and a sending unit. The sending unit is configured to complete a sending operation. For example, the sending unit may be configured to perform all sending operations performed by the first terminal device or the network device in the embodiment shown in FIG. 4, the embodiment shown in FIG. 5, the embodiment shown in FIG. 6, or the embodiment shown in FIG. 7. The receiving unit is configured to complete a receiving operation. For example, the receiving unit may be configured to perform all receiving operations performed by the first terminal device or the network device in the embodiment shown in FIG. 4, the embodiment shown in FIG. 5, the embodiment shown in FIG. 6, or the embodiment shown in FIG. 7.

For the functions that can be specifically implemented by the processing unit 810 and the transceiver unit 820, refer to the descriptions of the operations performed by the terminal device in the embodiment shown in FIG. 4, the embodiment shown in FIG. 5, the embodiment shown in FIG. 6, or the embodiment shown in FIG. 7, or the descriptions of the operations performed by the network device (for example, the access network device or the core network device) in the embodiment shown in FIG. 4, the embodiment shown in FIG. 5, the embodiment shown in FIG. 6, or the embodiment shown in FIG. 7. Details are not described again.

An embodiment of this application further provides a communication apparatus. The communication apparatus may be a terminal device or a circuit. The communication apparatus may be configured to perform the actions performed by the terminal device in the foregoing method embodiments.

Figure 9:
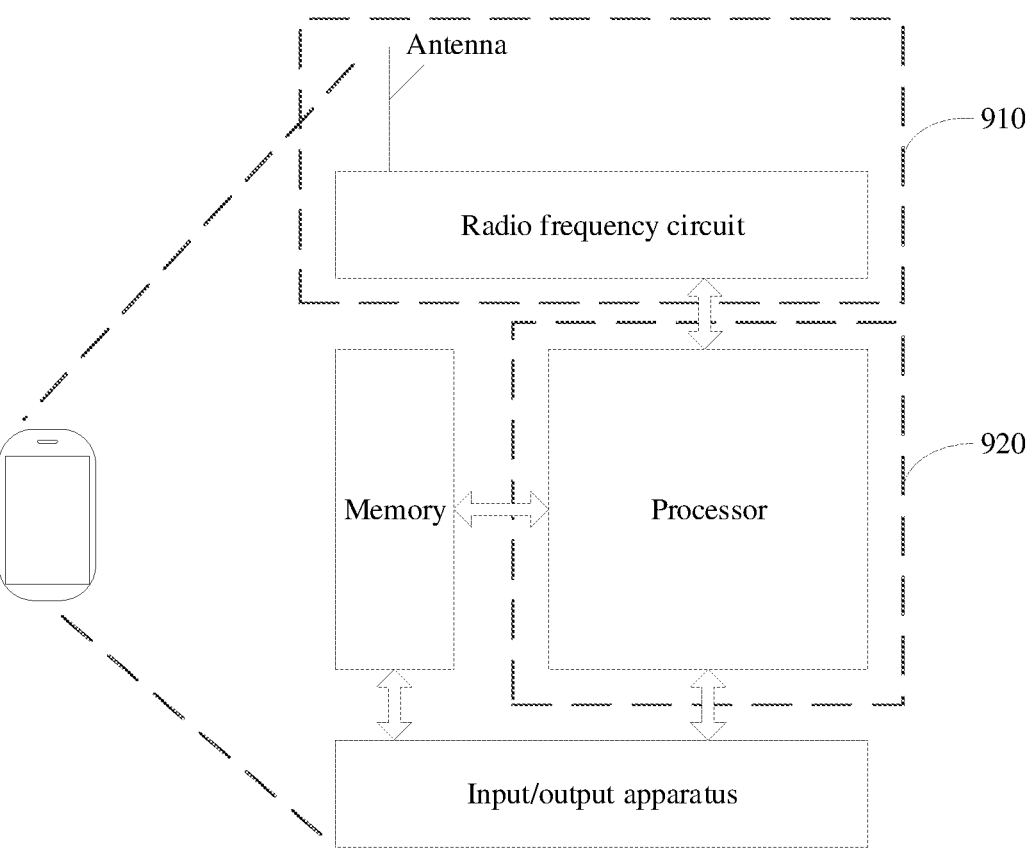
FIG. 9 is a schematic block diagram of another communication apparatus according to an embodiment of this application.

When the communication apparatus is a terminal device, FIG. 9 is a simplified schematic diagram of a structure of the terminal device. For ease of understanding and convenience of illustration, in FIG. 9, the terminal device is a mobile phone, for example. As shown in FIG. 9, the terminal device includes a processor, a memory, a radio frequency circuit, an antenna, and an input/output apparatus. The processor is mainly configured to process a communication protocol and communication data, control the terminal device, execute a software program, process data of the software program, and the like. The memory is configured to store the software program and the data. The radio frequency circuit is mainly configured to perform conversion between a baseband signal and a radio frequency signal, and process the radio frequency signal. The antenna is mainly configured to receive and send the radio frequency signal in a form of an electromagnetic wave. The input/output apparatus, such as a touchscreen, a display, or a keyboard, is mainly configured to: receive data input by a user and output data to the user. It should be noted that terminal devices of some types may have no input/output apparatus.

When data needs to be sent, the processor performs baseband processing on the to-be-sent data, and then outputs a baseband signal to the radio frequency circuit. After performing radio frequency processing on the baseband signal, the radio frequency circuit sends a radio frequency signal in a form of an electromagnetic wave to the outside through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, only one memory and one processor are shown in FIG. 9. In an actual terminal device product, there may be one or more processors and one or more memories. The memory may also be referred to as a storage medium, a storage device, or the like. The memory may be deployed independent of the processor, or may be integrated with the processor. This is not limited in embodiments of this application.

In this embodiment of this application, the antenna and the radio frequency circuit that have receiving and sending functions may be considered as a transceiver unit of the terminal device (where the transceiver unit may be one functional unit, and the functional unit can implement a sending function and a receiving function; or the transceiver unit may include two functional units: a receiving unit that can implement a receiving function and a sending unit that can implement a sending function), and the processor that has a processing function may be considered as a processing unit of the terminal device. As shown in FIG. 9, the terminal device includes a transceiver unit 910 and a processing unit 920. The transceiver unit may also be referred to as a transceiver machine, a transceiver, a transceiver apparatus, or the like. The processing unit may also be referred to as a processor, a processing board, a processing module, a processing apparatus, or the like. Optionally, a component that is in the transceiver unit 910 and that is configured to implement a receiving function may be considered as a receiving unit, and a component that is in the transceiver unit 910 and that is configured to implement a sending function may be considered as a sending unit. To be specific, the transceiver unit 910 includes the receiving unit and the sending unit. The transceiver unit may sometimes be referred to as a transceiver, a transceiver machine, a transceiver circuit, or the like. The receiving unit may also be sometimes referred to as a receiver, a receiver machine, a receiver circuit, or the like. The sending unit sometimes may also be referred to as a transmitter, a transmitter machine, a transmitter circuit, or the like.

It should be understood that the transceiver unit 910 is configured to perform the sending operations and the receiving operations on the terminal device side in the embodiment shown in FIG. 4, the embodiment shown in FIG. 5, the embodiment shown in FIG. 6, or the embodiment shown in FIG. 7, and the processing unit 920 is configured to perform other operations than the receiving and sending operations on the first terminal device side in the embodiment shown in FIG. 4, the embodiment shown in FIG. 5, the embodiment shown in FIG. 6, or the embodiment shown in FIG. 7.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

It should be understood that the processor mentioned in embodiments of this application may be a CPU, or may be another general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate, a transistor logic device, a discrete hardware component, or the like. The general-purpose processor may be a microprocessor, or the processor may be any conventional processor, or the like.

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described herein is intended to include but not limited to these memories and any memory of another appropriate type.

It should be understood that, in embodiments of this application, sequence numbers of the foregoing processes do not mean execution sequences. The execution sequences of the processes should be determined based on functions and internal logic of the processes, and should not constitute any limitation on implementation processes of embodiments of this application.

A person of ordinary skill in the art may be aware that units and algorithm steps described with reference to embodiments disclosed in this specification can be implemented by electronic hardware, or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may or may not be physical units, may be located in one position, or may be distributed on a plurality of network units. Some or all of the units may be selected depending on actual requirements to achieve the objectives of the solutions in embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing computer-readable storage medium may be any usable medium that can be accessed by a computer. For example, the computer-readable medium may include, but is not limited to, a random access memory (random access memory, RAM), a read-only memory (read-only memory, ROM), a programmable read-only memory (programmable ROM, PROM), an erasable programmable read-only memory (erasable PROM, EPROM), an electrically erasable programmable read-only memory (electrically erasable programmable read only memory, EEPROM), a compact disc read-only memory (compact disc read-only memory, CD-ROM), a universal serial bus flash memory (universal serial bus flash disk), a removable hard disk, a magnetic disk storage medium, or another magnetic storage device, or any other medium that can be used to carry or store expected program code in a form of instructions or a data structure and that can be accessed by a computer. By way of example rather than limiting description, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A method, comprising:
determining, by a core network device, a first cycle based on non-access stratum (NAS) timing information, wherein the first cycle is a maximum extended discontinuous reception (eDRX) cycle that is allowed to be configured for a first terminal device, and the first cycle is able to be used by the first terminal device in a radio resource control (RRC) inactive state;
sending, by the core network device, an initial context setup request message to an access network device in a registration process of the first terminal device, wherein the initial context setup request message comprises context information of the first terminal device, and the initial context setup request message further comprises information of the first cycle;
receiving, by the access network device, the initial context setup request message, and determining a second cycle based on the information of the first cycle carried in the initial context setup request message, wherein the second cycle is an eDRX cycle configured for the first terminal device, the second cycle is able to be used by the first terminal device in the RRC inactive state, and a length of the second cycle is less than or equal to a length of the first cycle;
sending, by the access network device, an initial context setup response message to the core network device, wherein the initial context setup response message comprises information of the second cycle;

starting, by the access network device, an RRC connection release timer when the first terminal device completes registration and the access network device does not detect data transmission of the first terminal device;

when the RRC connection release timer expires, sending, by the access network device, an RRC connection release message to the first terminal device, wherein the RRC connection release message comprises the information of the second cycle; and when the first terminal device is in the RRC inactive state, monitoring, by the first terminal device, paging according to the second cycle.

2. A method, comprising:

receiving, by an access network device, a first message from a core network device, wherein the first message comprises information of a first cycle, the first cycle is determined based on non-access stratum (NAS) timing information, the NAS timing information comprises a minimum retransmission time interval of a NAS message or a maximum number of retransmissions of the NAS message, the first cycle is a maximum extended discontinuous reception (eDRX) cycle that is allowed to be configured for a first terminal device, and the first cycle is able to be used by the first terminal device in a radio resource control (RRC) inactive state;

determining, by the access network device, a second cycle based on the first cycle, wherein the second cycle is an eDRX cycle configured for the first terminal device, the second cycle is able to be used by the first terminal device in RRC inactive state, and a length of the second cycle is less than or equal to a length of the first cycle; and sending, by the access network device, a second message to the core network device, wherein the second message comprises information of the second cycle, and wherein:

the second message is an initial context setup response message; or the second message is an RRC inactive transition report; or the second message is an Access and Mobility Management Function (AMF) configuration update acknowledgment message.

3. The method according to claim 2, wherein:

the first message is an initial context setup request message.

4. The method according to claim 2, further comprising:

sending, by the access network device, a third message to the first terminal device, wherein the third message comprises the information of the second cycle.

5. The method according to claim 4, wherein the third message is an RRC connection release message, and the RRC connection release message indicates to the first terminal device to transition to the RRC inactive state.

6. The method according to claim 2, wherein lengths of eDRX cycles that are configured, based on the first cycle, by the access network device for different terminal devices to use in the RRC inactive state are different.

7. The method according to claim 2, wherein the first terminal device is a reduced capability (redcap) UE.

8. The method according to claim 2, wherein:

the first message is an AMF configuration update message, and the second message is the AMF configuration update acknowledgment message; or the first message is an next generation (NG) setup response message.

9. The method according to claim 2, further comprising:

sending, by the access network device, a third message to a second terminal device, wherein the third message comprises information of a third cycle, a length of the third cycle is less than or equal to the length of the second cycle, the third cycle is an eDRX cycle configured for the second terminal device, and the third cycle is able to be used by the second terminal device in the RRC inactive state; and sending, by the access network device, a fourth message to a third terminal device, wherein the fourth message comprises information of a fourth cycle, a length of the fourth cycle is less than or equal to the length of the second cycle, the fourth cycle is an eDRX cycle configured for the second terminal device, and the fourth cycle is able to be used by the second terminal device in the RRC inactive state; and wherein the length of the third cycle is the same as or different from the length of the fourth cycle, and the first terminal device is a plurality of first terminal devices, and the second terminal device and the third terminal device belong to the plurality of first terminal devices.

10. The method according to claim 2, wherein lengths of the second cycle determined by the access network device for different terminal devices based on the first cycle are different.

11. The method according to claim 5, further comprising:

starting, by the access network device, an RRC connection release timer when the first terminal device completes registration and the access network device does not detect data transmission of the first terminal device; and wherein sending, by the access network device, the third message to the first terminal device comprises:

when the RRC connection release timer expires, sending, by the access network device, the RRC connection release message to the first terminal device, wherein the RRC connection release message comprises the information of the second cycle.

12. A method, comprising:

sending, by a core network device, a first message to an access network device, wherein the first message comprises a first cycle, the first cycle is determined based on non-access stratum (NAS) timing information, the NAS timing information comprises a minimum retransmission time interval of a NAS message or a maximum number of retransmissions of the NAS message, the first cycle is a maximum extended discontinuous reception (eDRX) cycle that is allowed to be configured for a first terminal device, and the first cycle is able to be used by the first terminal device in a radio resource control (RRC) inactive state; and receiving, by the core network device, a second message from the access network device, wherein the second message comprises information of a second cycle, the second cycle is an eDRX cycle configured for the first terminal device, the second cycle is able to be used by the first terminal device in the RRC inactive state, and a length of the second cycle is less than or equal to a length of the first cycle, and wherein:

the second message is an initial context setup response message; or the second message is an RRC inactive transition report; or

the second message is an Access and Mobility Management Function (AMF) configuration update acknowledgment message.

13. The method according to claim 12, wherein:
the first message is an initial context setup request message.

14. The method according to claim 12, further comprising:
receiving, by the core network device, an RRC inactive transition report from the access network device, wherein the RRC inactive transition report indicates that the first terminal device enters the RRC inactive state; and
sending, by the core network device, a NAS message to the first terminal device according to the second cycle.

15. The method according to claim 12, wherein the first terminal device is a reduced capability (redcap) UE.

16. The method according to claim 12, wherein:
the first message is an AMF configuration update message, and the second message is the AMF configuration update acknowledgment message; or
the first message is a next generation (NG) setup response message.

17. The method according to claim 12, further comprising:
receiving, by the core network device, an RRC inactive transition report from the access network device, wherein the RRC inactive transition report indicates that the first terminal device enters the RRC inactive state; and
sending, by the core network device, a non-access stratum (NAS) message to the first terminal device according to the second cycle, wherein the first terminal device is covered by the access network device.

* * * * *